US011615439B2

(12) United States Patent
Sussman et al.

(10) Patent No.: US 11,615,439 B2
(45) Date of Patent: *Mar. 28, 2023

(54) METHOD AND APPARATUS FOR CLUSTERING PLATFORM SESSIONS AND USER ACCOUNTS ASSOCIATED WITH THE PLATFORM SESSIONS

(71) Applicant: GROUPON, INC., Chicago, IL (US)

(72) Inventors: Michael Gideon Sussman, Chicago, IL (US); Robb Broome, Chicago, IL (US); Siddhant Tandon, Palo Alto, CA (US)

(73) Assignee: GROUPON, INC., Chicago, IL (US)

( * ) Notice: Subject to any disclaimer, the term of this patent is extended or adjusted under 35 U.S.C. 154(b) by 59 days.

This patent is subject to a terminal disclaimer.

(21) Appl. No.: 17/305,905

(22) Filed: Jul. 16, 2021

(65) Prior Publication Data

US 2022/0005067 A1 Jan. 6, 2022

Related U.S. Application Data

(63) Continuation of application No. 16/434,757, filed on Jun. 7, 2019, now Pat. No. 11,100,531.

(60) Provisional application No. 62/682,488, filed on Jun. 8, 2018.

(51) Int. Cl.
  *G06Q 30/02* (2012.01)
  *G06Q 30/0242* (2023.01)
  (Continued)

(52) U.S. Cl.
  CPC ..... *G06Q 30/0243* (2013.01); *G06Q 30/0224* (2013.01); *G06Q 30/0239* (2013.01); *H04L 67/535* (2022.05)

(58) Field of Classification Search
  CPC .......... G06Q 30/0243; G06Q 30/0224; G06Q 30/0239; H04L 67/22
  See application file for complete search history.

(56) References Cited

U.S. PATENT DOCUMENTS

6,968,511 B1 * 11/2005 Robertson ............... G06F 3/048
  715/848
9,742,871 B1 * 8/2017 Gibson ................... H04L 67/63
  (Continued)

OTHER PUBLICATIONS

NPL Hung IEEE 2014.*
  (Continued)

*Primary Examiner* — Michael I Ezewoko
(74) *Attorney, Agent, or Firm* — Alston & Bird LLP

(57) ABSTRACT

Embodiments of the present disclosure provide methods, systems, apparatuses, and computer program products that provide for an improved and more efficient system for transmitting content to client devices. The embodiments disclose an apparatus that clusters user behavior based on platform session records. The platform session records comprise stored data associated with a plurality of user inputs received by the system for the duration of a platform session. The apparatus and methods transform the platform session records into data comprising a form that is usable for identifying clusters of platform sessions. As a result of the clustering methodologies, the apparatus is configured to deliver content specifically optimized for users of client devices. The present disclosure thus provides for an improved networked system that reduces the amount of data transferred via the network and allows for a more efficient system that has reduced infrastructure requirements and improved performance.

15 Claims, 17 Drawing Sheets

(51) Int. Cl.
G06Q 30/0207 (2023.01)
H04L 67/50 (2022.01)

(56) References Cited

U.S. PATENT DOCUMENTS

| | | | |
|---|---|---|---|
| 2012/0254388 A1* | 10/2012 | Duxbury | H04L 43/026 |
| | | | 709/223 |
| 2014/0237114 A1* | 8/2014 | Lin | G06F 9/5055 |
| | | | 709/224 |
| 2015/0301795 A1* | 10/2015 | Lebrun | G10L 15/18 |
| | | | 704/9 |
| 2016/0253681 A1* | 9/2016 | de Souza | G06F 16/2465 |
| | | | 705/13 |
| 2017/0262773 A1* | 9/2017 | Swaminathan | G06N 20/00 |

OTHER PUBLICATIONS

Ansari, IEEE, 2001.
Bujlow, IEEE, 2015.
Bujlow, IEEE, 2017.
Chen, IBM Redbooks, 2015.
Hasan, Concordia, 2009.
Hesselman, IEEE, 2010.
Hu, IEEE, 2002.
Nasraoui, IEEE, 2008.
Vasthimal, IEEE, 2019.
Zhang, IEEE, 2013.

* cited by examiner

| 601 SESSION IDENTIFIER | 602 USER ACCOUNT IDENTIFIER | 603 FIRST-LEVEL PLATFORM ENGAGEMENT COUNT | 604 PLATFORM QUERY COUNT | 605 SECOND-LEVEL PLATFORM ENGAGEMENT COUNT | 606 PLATFORM OUTPUT STATUS INDICATOR | 607 SESSION LENGTH |
|---|---|---|---|---|---|---|
| BIGINT(20) UNSIGNED | BIGINT(20) UNSIGNED | BIGINT(20) UNSIGNED | BIGINT(20) UNSIGNED | BIGINT(20) UNSIGNED | TINYINT(3) | BIGINT(20) UNSIGNED |
| BIGINT(20) UNSIGNED | BIGINT(20) UNSIGNED | BIGINT(20) UNSIGNED | BIGINT(20) UNSIGNED | BIGINT(20) UNSIGNED | TINYINT(3) | BIGINT(20) UNSIGNED |
| BIGINT(20) UNSIGNED | BIGINT(20) UNSIGNED | BIGINT(20) UNSIGNED | BIGINT(20) UNSIGNED | BIGINT(20) UNSIGNED | TINYINT(3) | BIGINT(20) UNSIGNED |
| BIGINT(20) UNSIGNED | BIGINT(20) UNSIGNED | BIGINT(20) UNSIGNED | BIGINT(20) UNSIGNED | BIGINT(20) UNSIGNED | TINYINT(3) | BIGINT(20) UNSIGNED |
| BIGINT(20) UNSIGNED | BIGINT(20) UNSIGNED | BIGINT(20) UNSIGNED | BIGINT(20) UNSIGNED | BIGINT(20) UNSIGNED | TINYINT(3) | BIGINT(20) UNSIGNED |
| BIGINT(20) UNSIGNED | BIGINT(20) UNSIGNED | BIGINT(20) UNSIGNED | BIGINT(20) UNSIGNED | BIGINT(20) UNSIGNED | TINYINT(3) | BIGINT(20) UNSIGNED |

FIG. 6

Finch  New Experiment  Experiments  Minimum Sample Size Calculator  Anomalous Data

LS-3106-AddressAutocomplete-14974699903069816

Details | Results

Population 1 ▼ / 06/22/2017 - 06/23/2017 ▼

Data fresh as of:
About 2 months ago

Status: Flat —— 1402

The experiment is complete, but there were no treatments that were likely to beat the control.

Slice Data  Behavior ▼

| | | User Sessions | | | |
|---|---|---|---|---|---|
| | Sessions | Total | ◂ —— 1401 | T-score | Lift (Sensitivity: 0.50%) |
| Variant | | | hunter | | |
| | | | hunter | | |
| | | | gatherer | | |
| | Total | | scroller | | |
| Treatment | 1,022,300 | 111,113 | bouncer | 1.150 | 0.46% (= 0.79%) |
| Control:control | 1,021,650 | 110,602 | bad_hunter | N/A | N/A |

FIG. 14

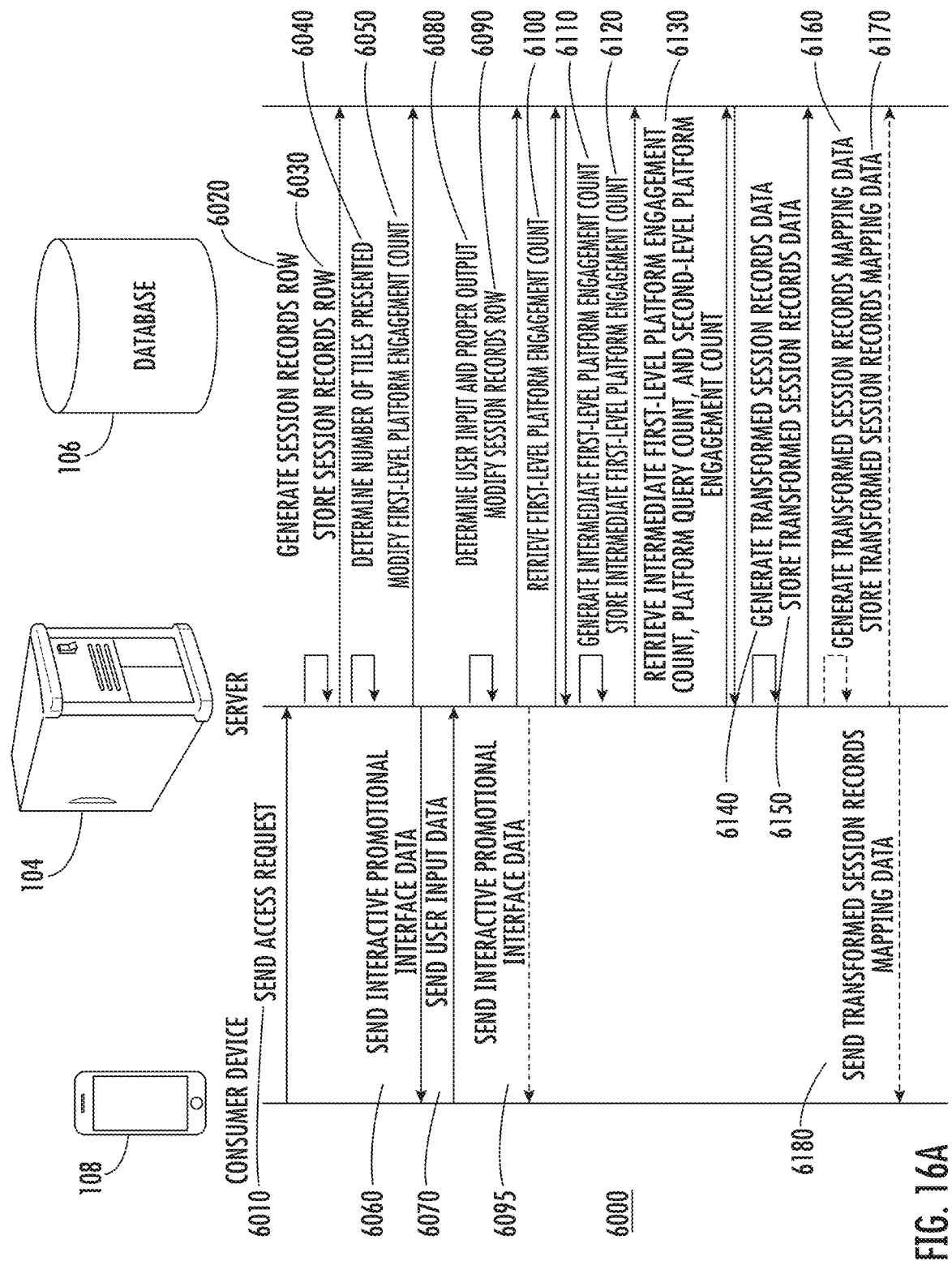

METHOD AND APPARATUS FOR CLUSTERING PLATFORM SESSIONS AND USER ACCOUNTS ASSOCIATED WITH THE PLATFORM SESSIONS

CROSS-REFERENCE TO RELATED APPLICATIONS

This application is a continuation of U.S. Non-Provisional application Ser. No. 16/434,757, entitled "METHOD AND APPARATUS FOR CLUSTERING PLATFORM SESSIONS AND USER ACCOUNTS ASSOCIATED WITH THE PLATFORM SESSIONS", and filed Jun. 7, 2019, which claims priority to and the benefit of US Provisional Application No. 62/682,488, entitled "METHOD AND APPARATUS FOR CLUSTERING PLATFORM SESSIONS AND USER ACCOUNTS ASSOCIATED WITH THE PLATFORM SESSIONS", and filed Jun. 8, 2018, each of which is incorporated herein by reference in its entirety.

FIELD

Embodiments of the present disclosure relate, generally, to tracking, storing, retrieving and clustering data comprising user behavior as captured by user input data collected during platform sessions.

BACKGROUND

Promotional systems provide electronic promotions data to user devices via various platforms such as mobile applications or web browsers. Users may access such electronic promotions data using various devices, including mobile devices (e.g., mobile phone, tablet, etc.) or desktop devices (e.g., personal computer, workstation, etc.). Various technologies and techniques exist for monitoring user behavior based on their mobile application and web browser activity. Applicant has identified a variety of improvements associated with such technologies and techniques as further discussed herein.

BRIEF SUMMARY

A system, apparatus, and method are provided to, in general, improve systems that track user input data during platform sessions. More specifically, embodiments provided herein may include a system, apparatus and method for clustering platform sessions and user accounts associated with the platform sessions. The system, apparatus, and method include at least one processor coupled to a data repository, and the data repository stores computer-executable instructions that may be executed by the process, which causes the processor(s) to perform various steps. Thus, the system, and apparatus and method provide for at least one processor configured to access the data repository in order to access sessions data associated with the platform sessions. The sessions data include a plurality of session records, and in turn, each session record includes a session identifier, a first-level platform engagement count, a second-level platform engagement count, a platform query count, and a platform output status indicator.

The system, apparatus, and method provide for retrieving, from the data repository and for each session record, the first-level platform engagement count to generate an intermediate first-level platform engagement count. The intermediate first-level platform engagement count is at least partially determined by dividing the first-level platform engagement count by a first-level platform engagement normalization factor. Further, the first-level platform engagement normalization factor is common among all session records.

The system, apparatus, and method further provide for storing the intermediate first-level platform engagement count and associate the intermediate first-level platform engagement count with a session identifier. The system, apparatus, and method store the intermediate first-level platform engagement count for each session record in the data repository.

The system, apparatus, and method further retrieve for each session record, and from the data repository, the second-level platform engagement count, the platform query count, and the intermediate first-level platform engagement count in order to generate transformed session records data. The transformed session records data includes a transformed second-level platform engagement count, a transformed platform query count, and a transformed first-level platform engagement count. Further, the transformed second-level platform engagement count is at least partially determined by dividing the second-level platform engagement count by a session-specific normalization factor. Likewise, the transformed platform query count is at least partially determined by dividing the second-level platform engagement count by the session-specific normalization factor. Lastly, the transformed first-level platform engagement count is at least partially determined by dividing the intermediate first-level platform engagement count by the session-specific normalization factor.

In the steps described above, the system, apparatus, and method determine the session-specific normalization is separately for each session record. The system, apparatus, and method do so by adding the second-level platform engagement count, the platform query count, and the intermediate first-level platform engagement count of each session record.

The system, apparatus, and method further identify a plurality of clusters, where each cluster is associated with a subset of the platform sessions. The step of identifying the clusters utilizes the transformed second-level platform engagement count, the transformed platform query count, and the transformed first-level platform engagement count. Finally, for this step, each platform session of the plurality of platform sessions is associated with one cluster.

In at least some embodiments, the system, apparatus, and method provide for storing the transformed session records data in the data repository and for each session record. Further, the system, apparatus, and method associate the transformed session records data with a session identifier.

In some embodiments, the system, apparatus, and method provide for mapping, for each session record, the transformed session records data on a three-dimensional space. The mapping is based on session coordinates data that includes the transformed second-level platform engagement count, the transformed platform query count, and the transformed first-level platform engagement count. Further, the session coordinates data define a platform session location in the three-dimensional space.

In some embodiments, the plurality of clusters include classifications forbad hunters, scrollers, bouncers, gatherers, and hunters.

In some embodiments, the system, apparatus, and method provide for sending, to the client device, interactive promotional interface data. In these embodiments, the interactive promotional interface data presents to a user of the client device an interactive promotional interface that, in turn, presents impressions. The interactive promotional interface has a first configuration for when a first user associated with a first user account is logged into the client device. In these embodiments, the first user account is associated with a first cluster identifier. Further, the interactive promotional interface has a second configuration for when a second user associated with a second user account is logged into the client device. Similar to the first user account, the second user account is associated with a second cluster identifier.

As previously described, the system, apparatus, and method provide for identifying a plurality of clusters. In some embodiments, this identifying step includes the following steps: (a) determine a number of clusters to be identified; (b) generate, based on the number of clusters to be identified, a plurality of cluster-defining data, each cluster-defining data comprising a cluster identifier and centroid coordinates data, wherein the centroid coordinates data defines a centroid location in a three-dimensional space, and wherein initial values for the centroid coordinates data are randomly assigned; (c) associate, for each session record, the session identifier with a cluster identifier based on a determination of a distance between a platform session location in the three-dimensional space and a plurality of centroid locations in the three-dimensional space, wherein the plurality of centroid locations comprise centroid locations defined by the centroid coordinates data, and wherein the platform session location is defined by the transformed sessions records data; (d) modify, for each cluster-defining data, the centroid coordinates data to cause the centroid location to correspond to a center of mass in the three-dimensional space, wherein a determination of the center of mass is based on session records associated with the cluster identifier; and (e) repeat steps (c)-(d) until the centroid coordinates data remains the same between consecutive iterations of steps (c)-(d).

In some embodiments, the system, apparatus, and method further provide for receiving, from a client device, user account data associated with a user account. The system, apparatus, and method further associate the user account with one of the cluster identifiers corresponding to one of the plurality of clusters.

In some embodiments, the system, apparatus, and method further provide for associating each of a plurality of user accounts with one of the plurality of clusters via a cluster identifier. Further, the system, apparatus, and method send, to a client device, A/B testing interface data configured to cause the client device to display an A/B interface. The A/B interface enables user selection of one of the plurality of clusters, and it presents experiment results based at least in part on the user selection of one of the plurality of clusters. In another embodiment, the system, apparatus, and method include at least one processor coupled to a data repository, which includes computer-executable instructions that, when executed by the processor(s), configure the processor(s) to execute a number of steps. In this manner, the system, apparatus, and method provide for collecting and storing a plurality of platform session records rows in the data repository. Here, each of the plurality of platform session records rows includes data at least partially related to user input data provided during a platform sessions. Additionally, each of the plurality of platform session records rows includes a platform session identifier. The system, apparatus, and method further generate a plurality of session coordinates data at least partially based on the plurality of platform session records rows. The system, apparatus, and method further generate cluster-defining data for two or more clusters. The cluster-defining data includes a cluster identifier and centroid coordinates data. The system, apparatus, and method further associate each of the plurality of session records rows with one of the two or more clusters. The system, apparatus, and method further iteratively determine, for each of the two or more clusters, a center of mass based on a subset of the plurality of session records rows. Here, the subset of the plurality of session records rows includes session records rows associated with the cluster identifier corresponding to the cluster. Finally, the system, apparatus, and method provide for iteratively modifying, for each of the two or more clusters, the centroid coordinates data with values corresponding to the center of mass.

BRIEF DESCRIPTION OF THE DRAWINGS

Figure 1:
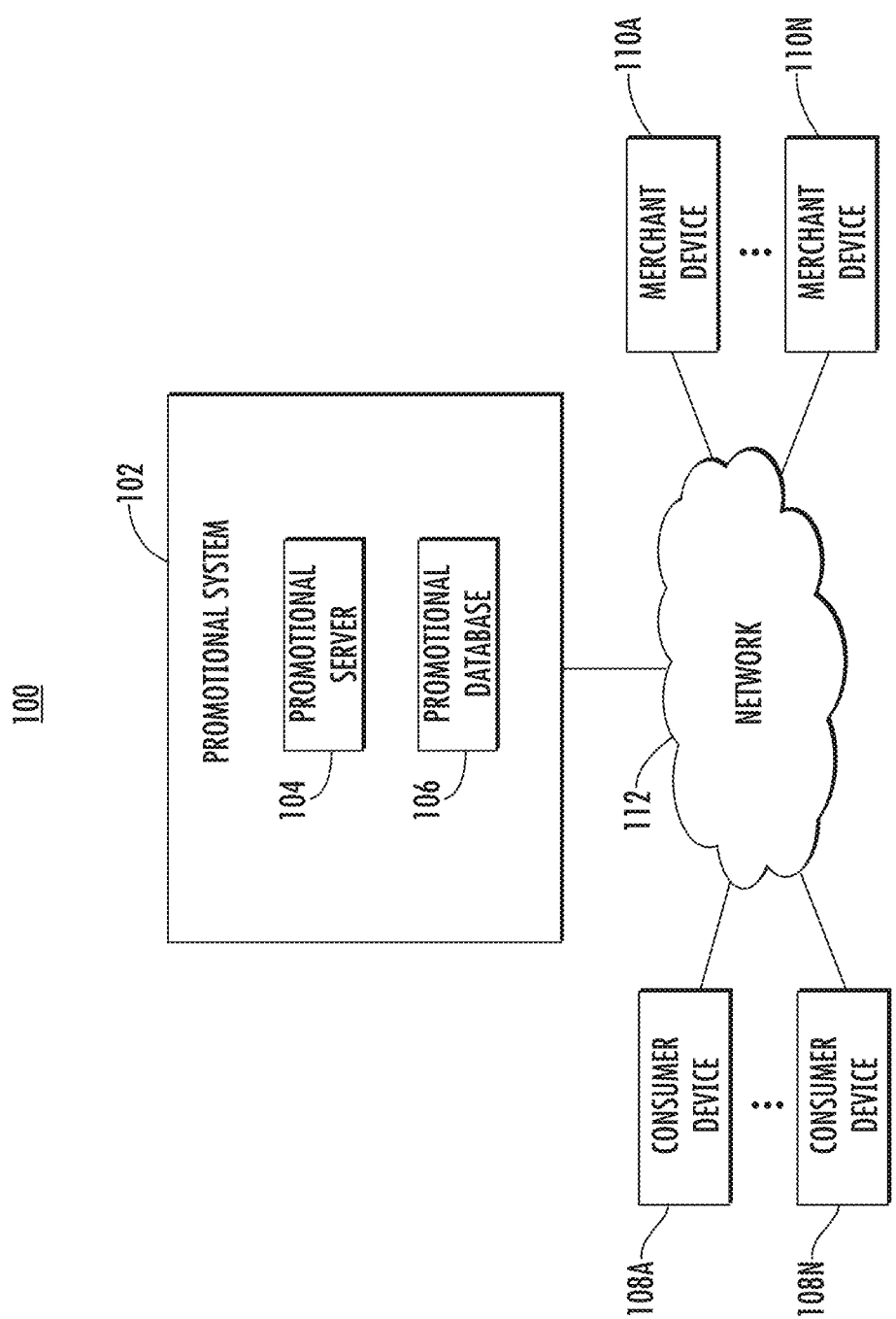
Figure 2:
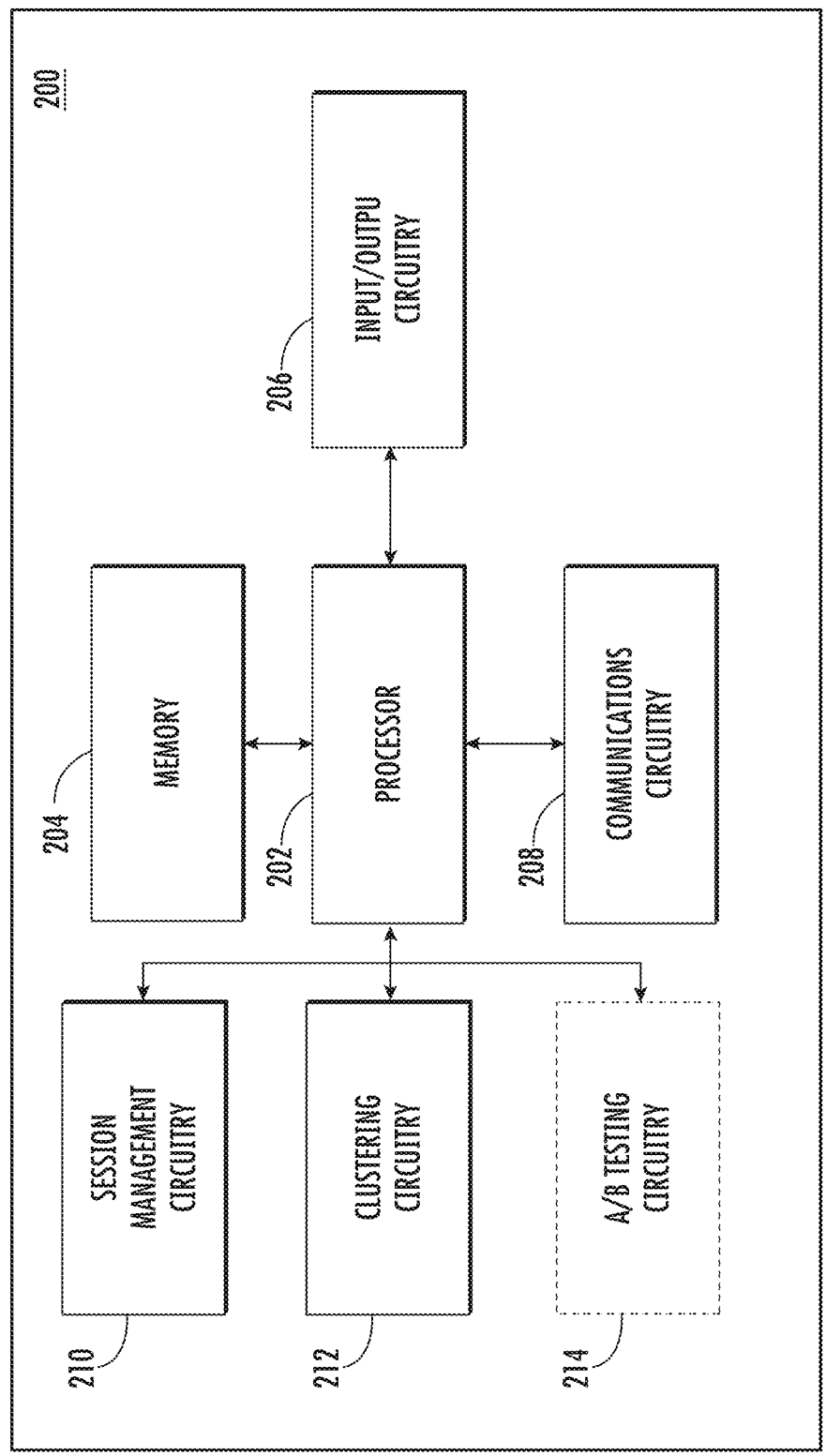
Figure 3:
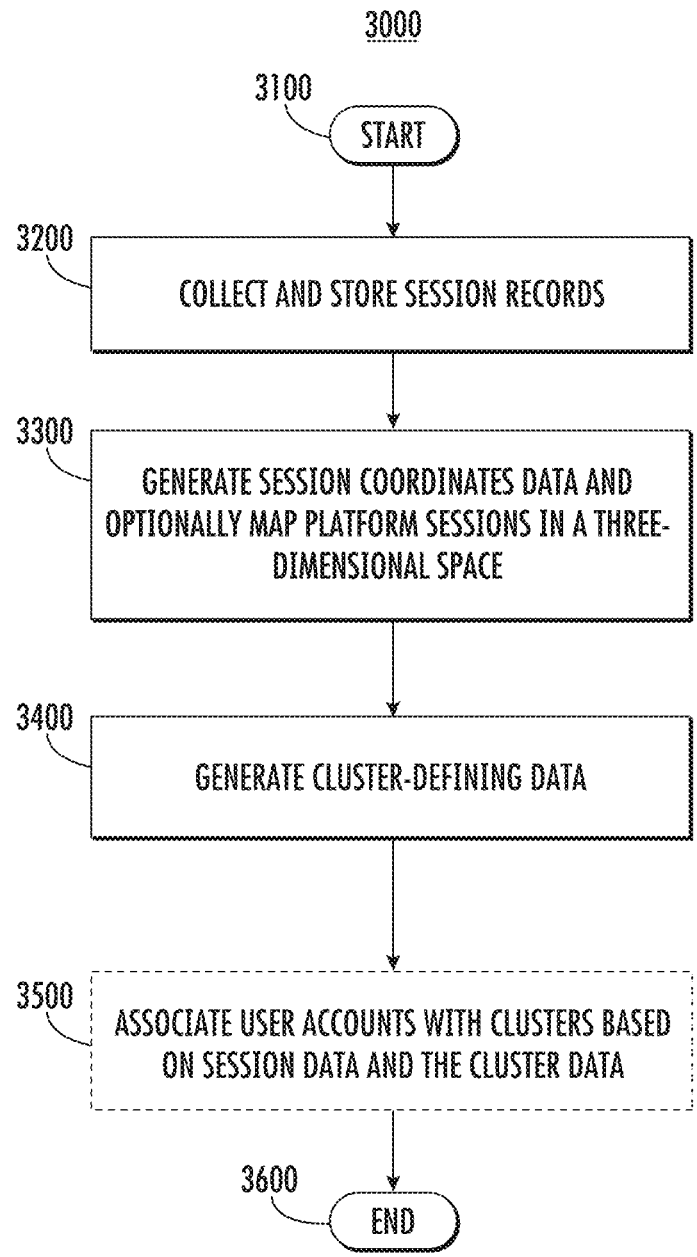
Figure 4:
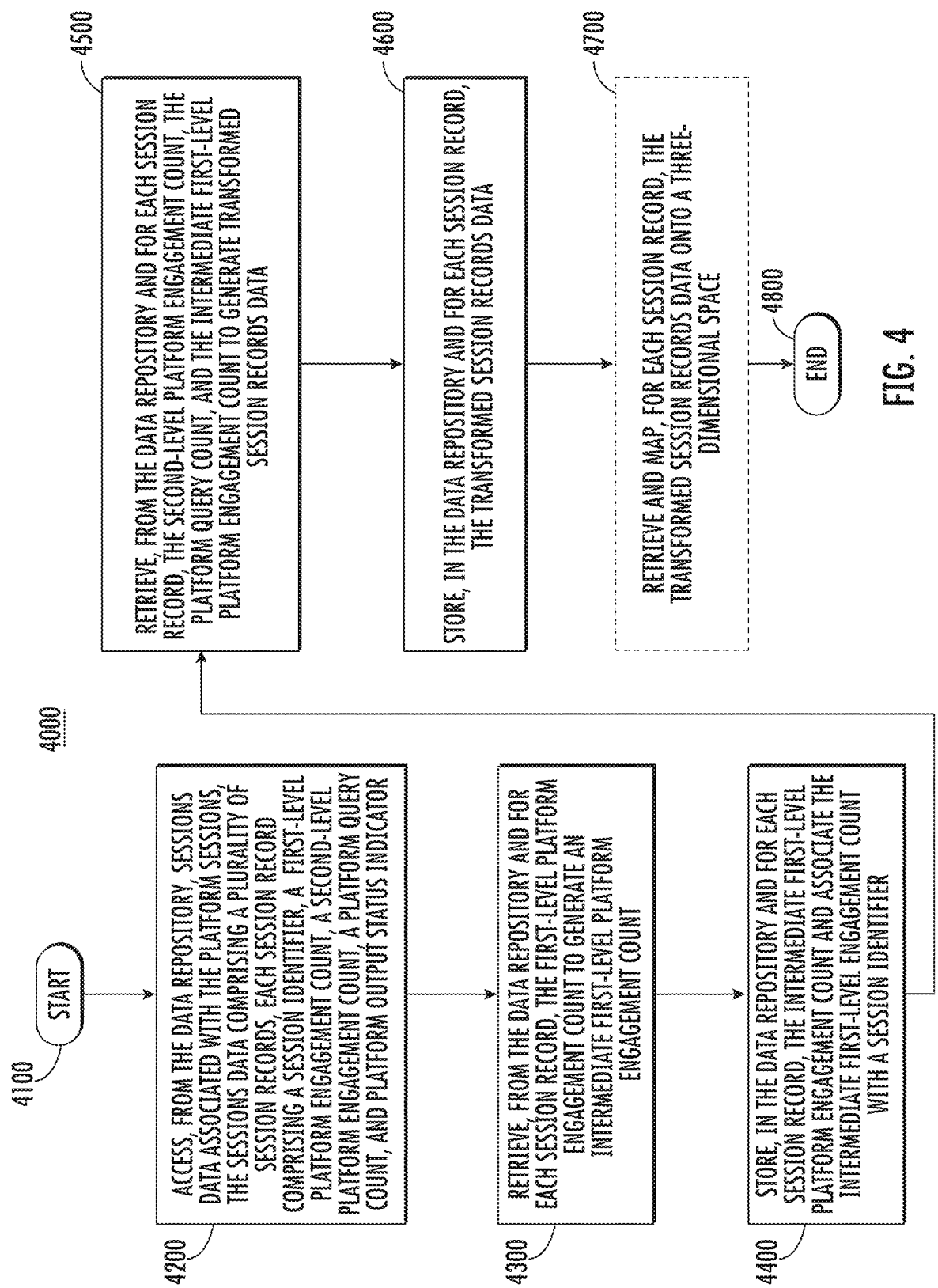
Figure 5:
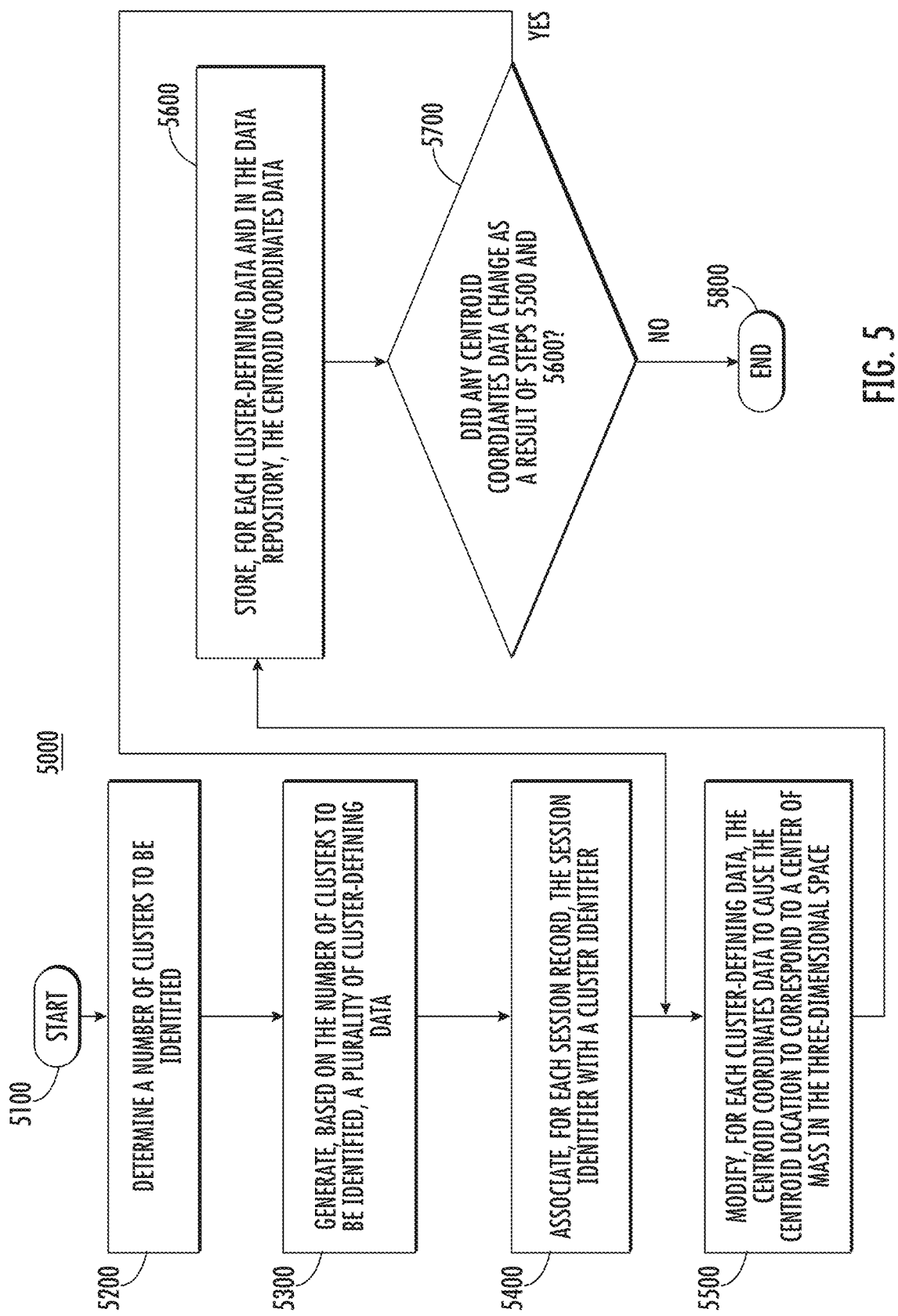
Figure 7:
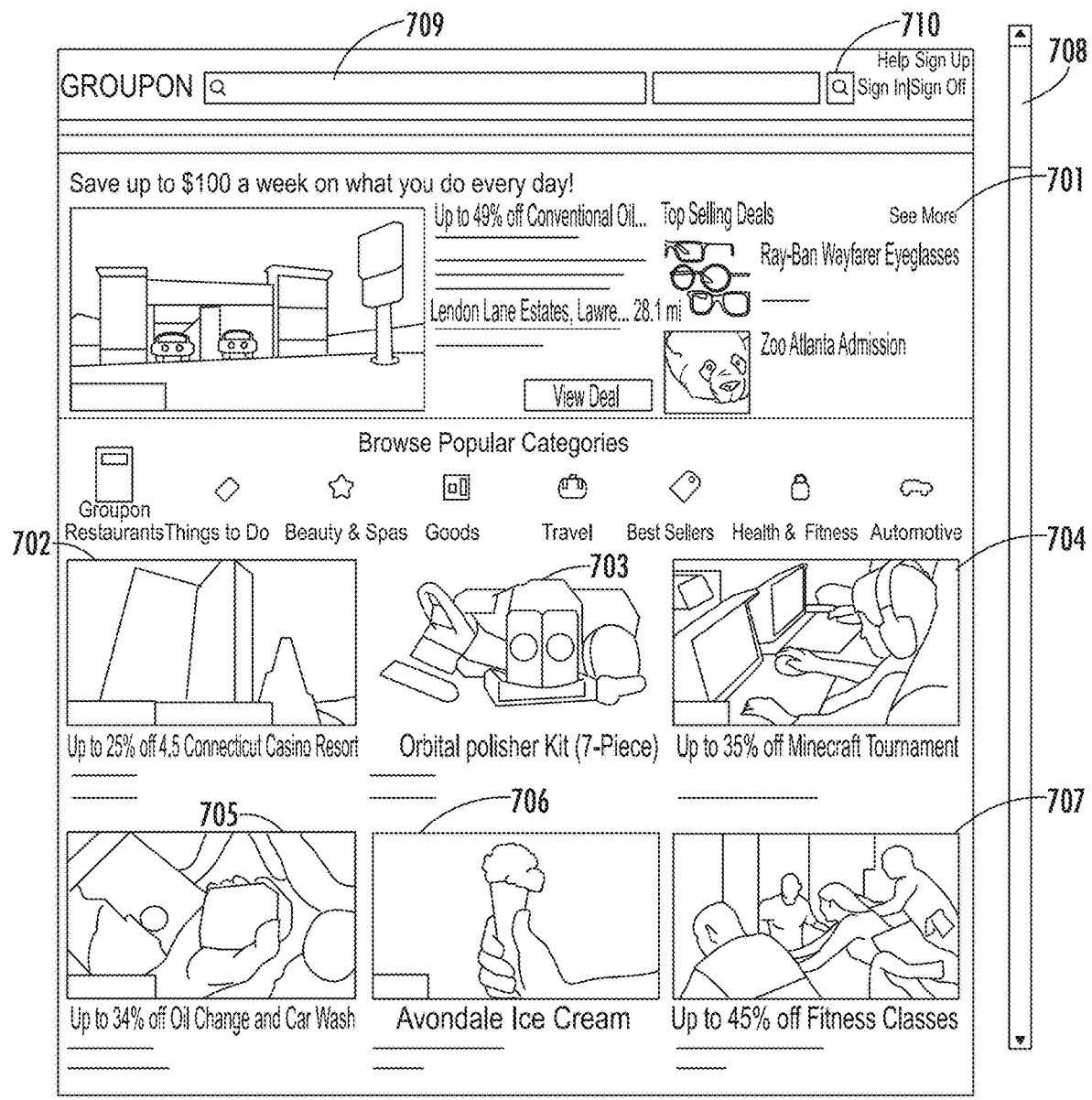
Figure 8:
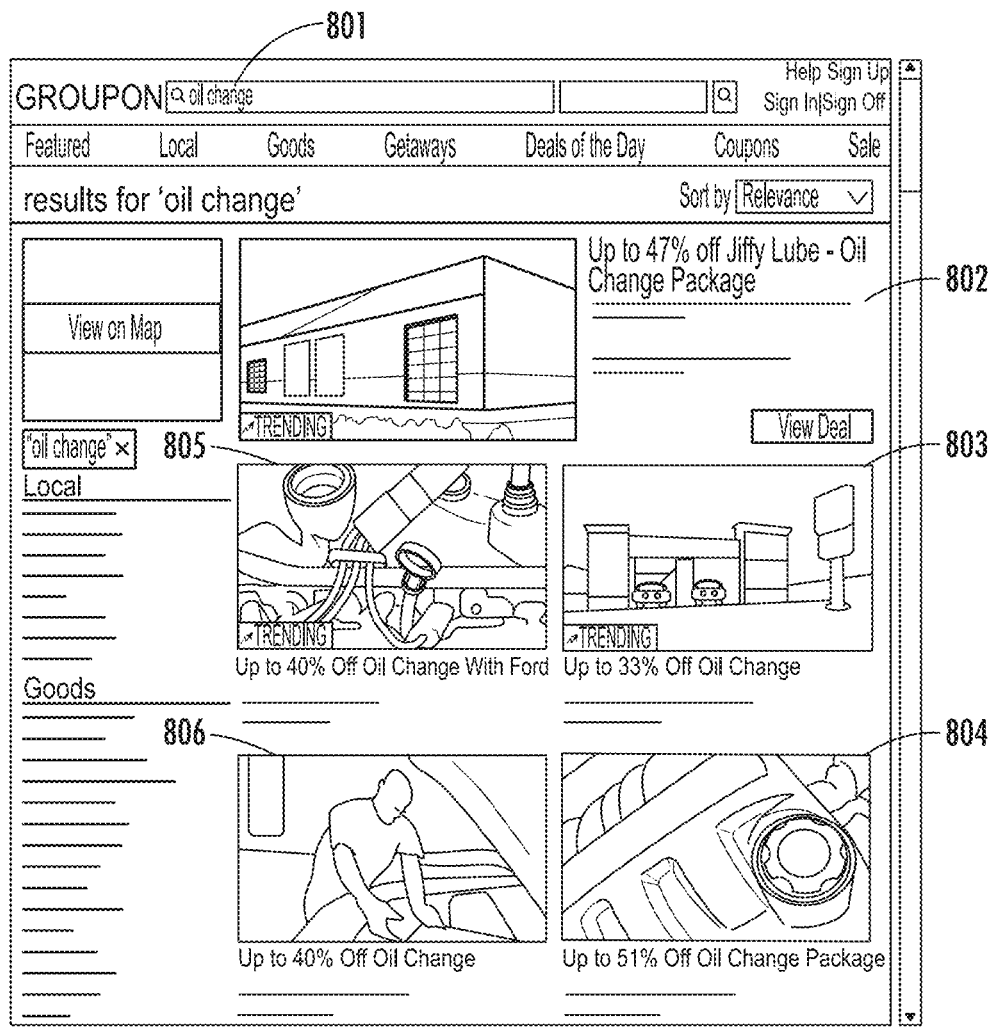
Figure 9:
Figure 10:
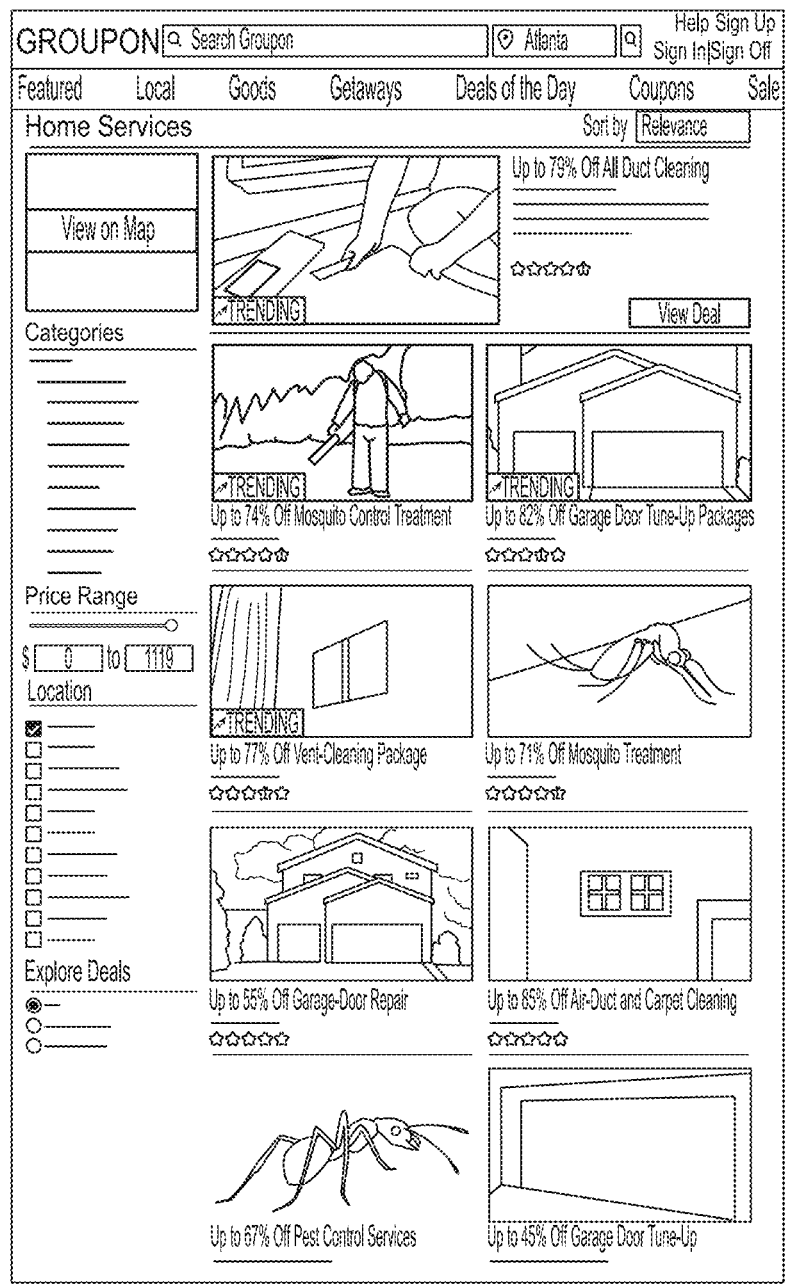
Figure 11A:
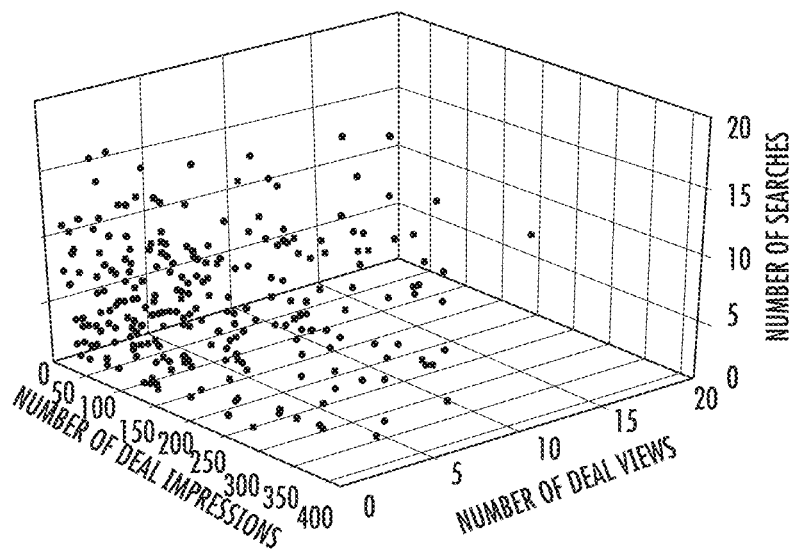
Figure 11B:
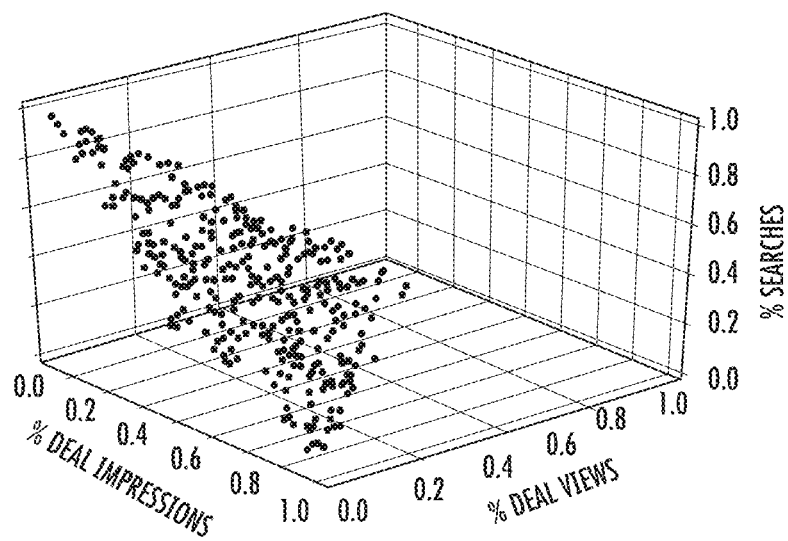
Figure 12:
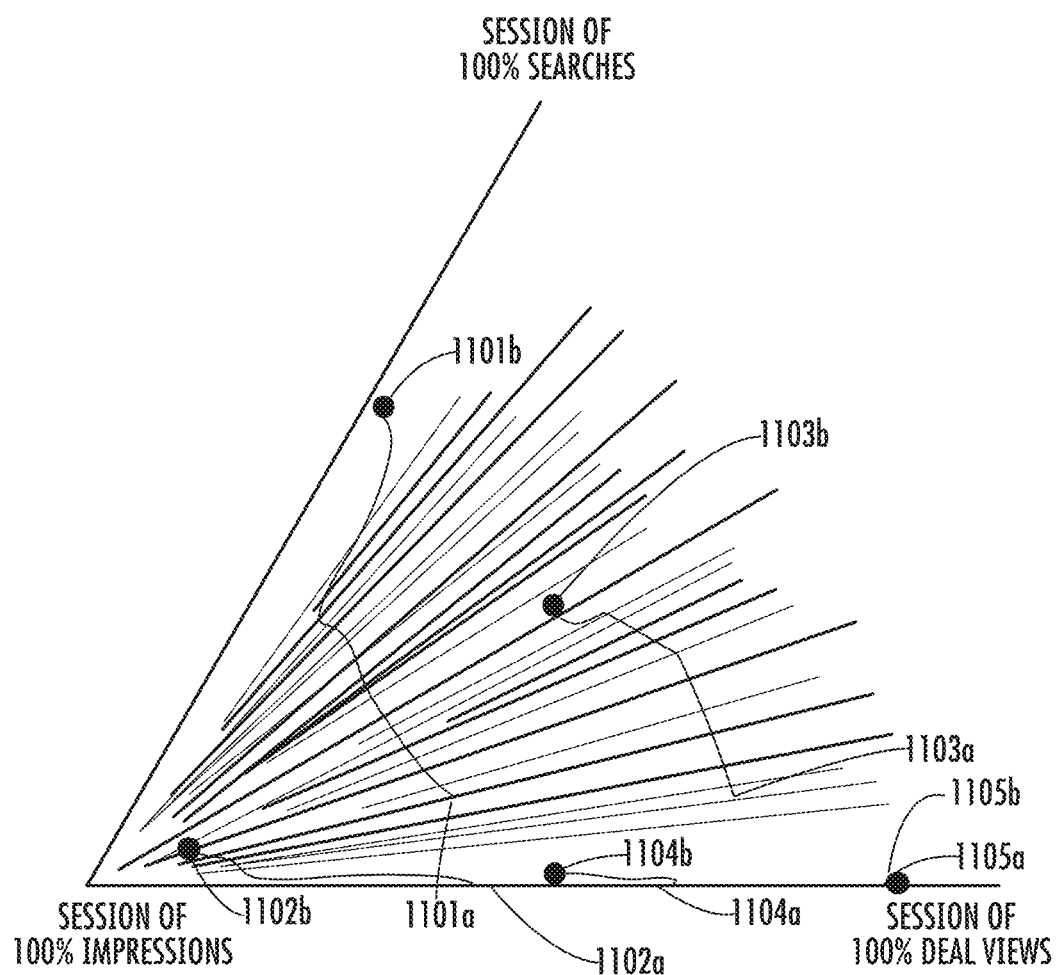
Figure 13:
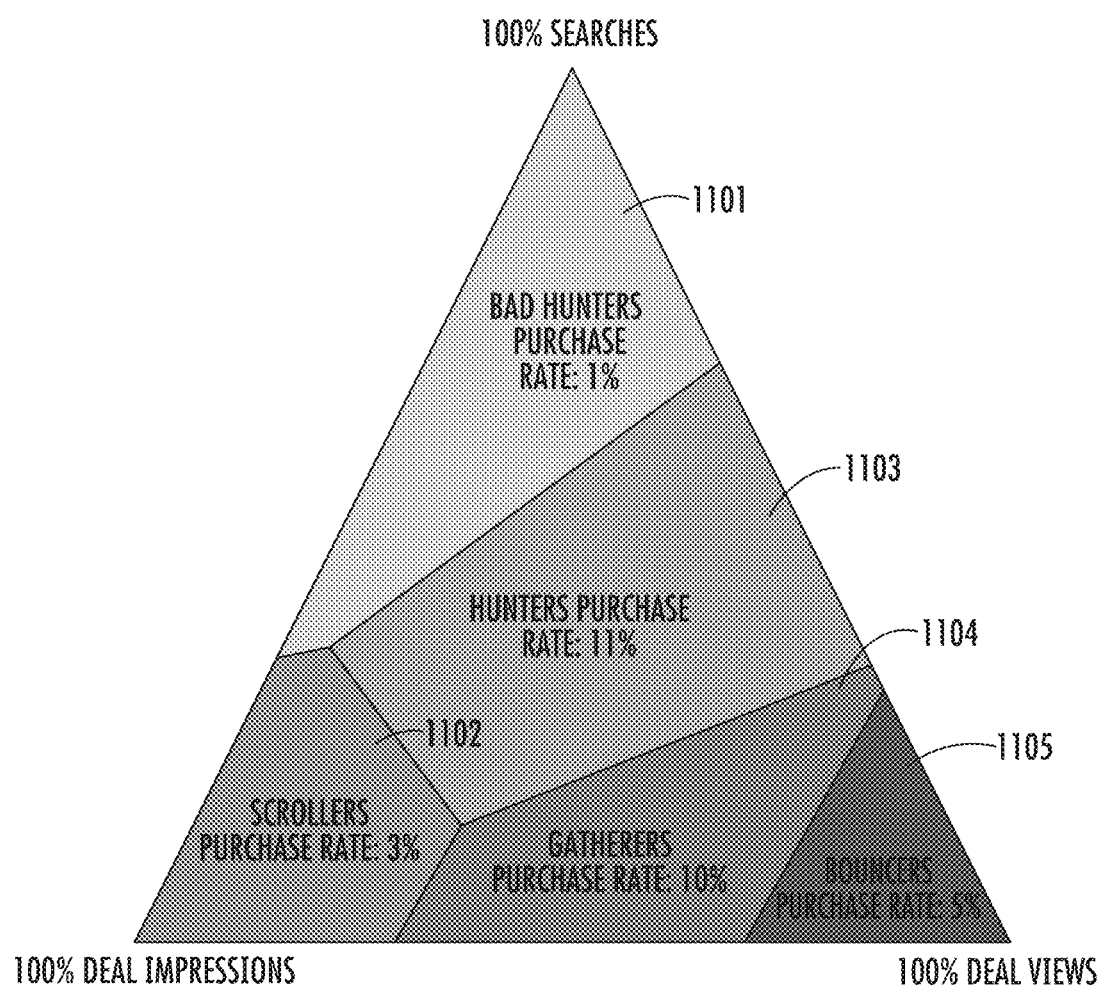
Figure 15B:
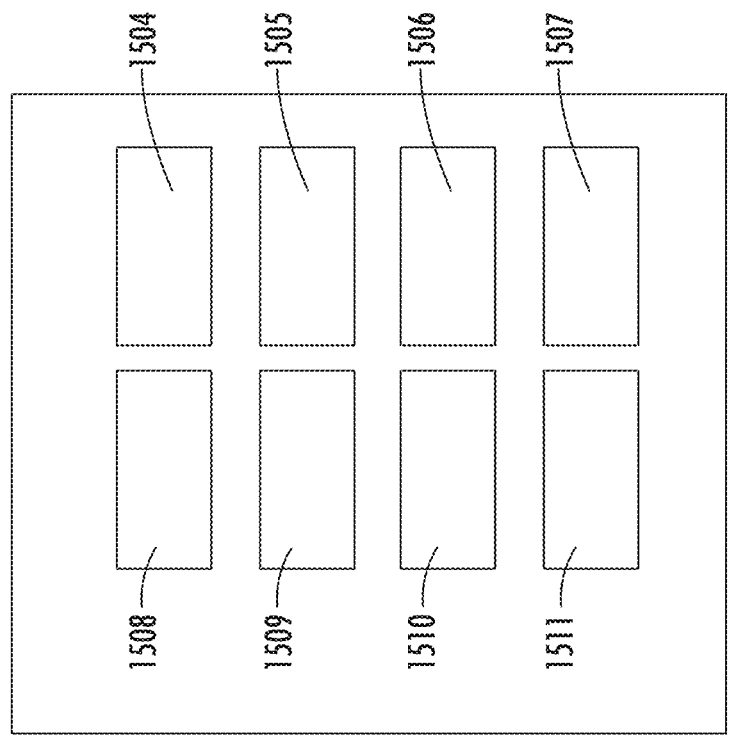
Figure 15A:
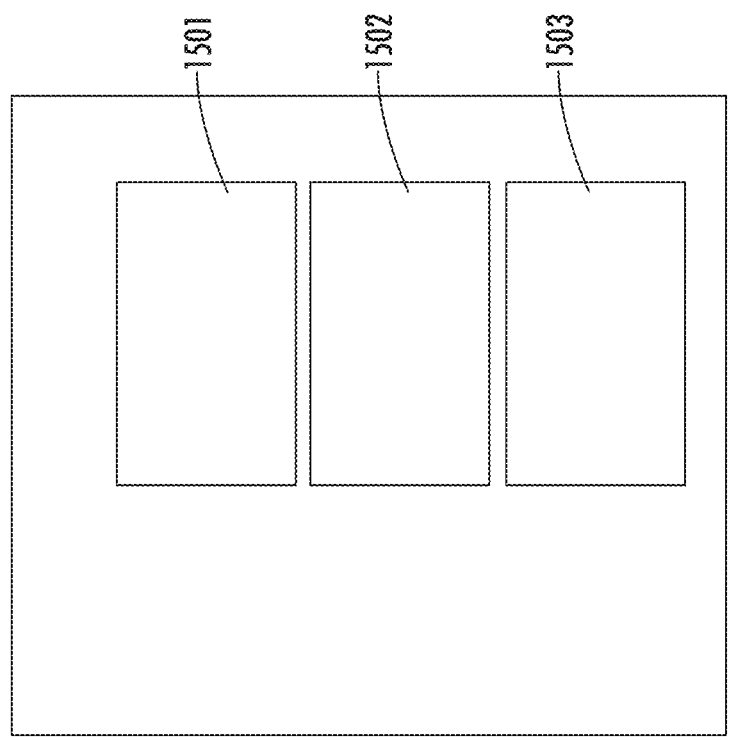
Figure 16B:
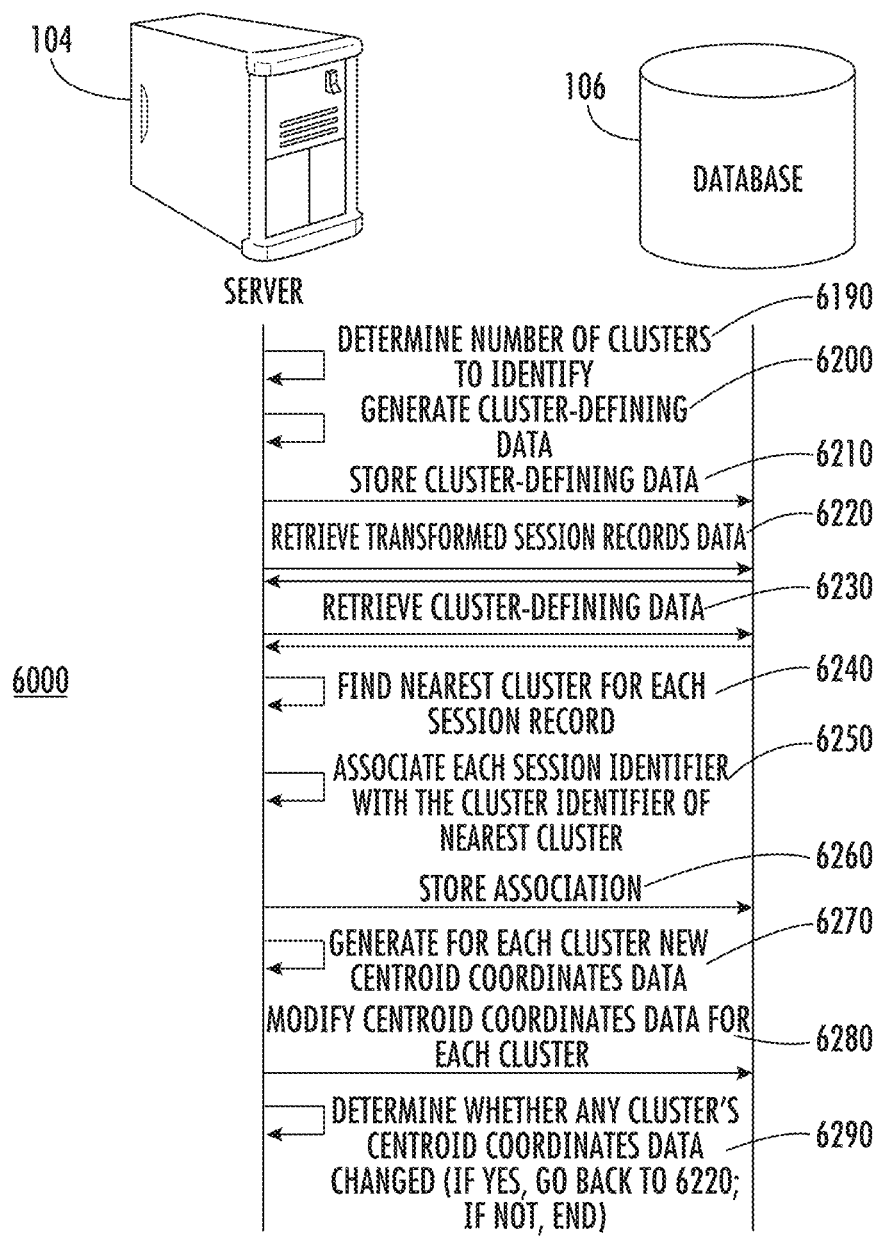

Having thus described some embodiments in general terms, reference will now be made to the accompanying drawings, which are not necessarily drawn to scale, and wherein:

FIG. 1 shows an example of a system in accordance with some embodiments;

FIG. 2 shows a schematic block diagram of example circuitry in accordance with some embodiments;

FIG. 3 shows an example method for clustering user behavior based on platform session records;

FIG. 4 shows an example method for generating transformed session records usable for clustering user behavior;

FIG. 5 shows an example method for generating clusters based on session records;

FIG. 6 shows an example embodiment of sessions data comprising session records;

FIG. 7 shows an example embodiment of a homepage displayed as part of an interactive promotional interface;

FIG. 8 shows an example embodiment of an interactive promotional interface presenting at least plurality of tiles and a query input component:

FIG. 9 shows an example embodiment of an interactive promotional interface presenting an item view;

FIG. 10 shows an example embodiment of an interactive promotional interface presenting another configuration comprising a larger number of tiles than a previous configuration (such as the embodiment depicted in FIG. 7);

FIGS. 11A and 11B show example embodiments of a three-dimensional space comprising mappings of platform sessions;

FIG. 12 shows an example embodiment depicting a visualization of a method for clustering user behavior based on platform sessions;

FIG. 13 shows an example embodiment of categorization boundaries based on clustering user behavior, FIG. 14 shows an example embodiment of an A/B testing interface that incorporates clustering of user behavior;

FIGS. 15A and 15B show example first and second layouts that may be presented by an interactive promotional interface depending on the cluster identifier associated with a user account; and FIGS. 16A and 16B show example signal diagrams of an example data flow.

DETAILED DESCRIPTION

Some embodiments of the present disclosure will now be described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being captured, transmitted, received, stored, or a combination thereof in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and the like.

As used herein, the term "promotional system" refers to one or more computing devices that are accessible to users over a network and that operate to provide promotion services, marketing services, or both on behalf of one or more providers that are offering one or more instruments that are redeemable for goods, services, experiences and the like. In some examples, the promotion and marketing service may take the form of a redemption authority, a payment processor, a rewards provider, an entity in a financial network, a promoter, an agent and the like. As such, the promotional system is, in some example embodiments, configured to present one or more promotions via one or more impressions, accept payments for promotions from consumers, issue instruments upon acceptance of an offer, participate in redemption, generate rewards, provide a point of sale device or service, issue payments to providers or otherwise participate in the exchange of goods, services or experiences for currency, value and the like. The promotional system is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the term "client device" refers to an apparatus configured to access and present data provided by a server of promotional system. In that sense, a client device is configured for sending and receiving data to and from a server of the promotional system. Additionally, the client device, in some embodiments, is configured for presenting content via a display. The client device accesses content of the promotional system such as, for example, by accessing a website (e.g., using a web browser) hosted by a promotional system or executing a mobile application configured to present data provided by the promotional system. Some examples of client devices include, without limitation, standalone computers, set-top boxes, mobile devices such as a laptop, mobile phone, tablet, smart watch, head-mounted display or the like. A person having ordinary skill in the art would recognize that other variations of client devices are contemplated in this disclosure, for example, this disclosure contemplates that a client device may comprise a point-of-sale device at a merchant location, a computing device configured to display information inside of a vehicle such as a car, boat, or aircraft, and the like. In some embodiments, a client device sends request data to the promotional system, such as in response to a consumer activity facilitated by a user interface such as, without limitation, clicking a link, selecting particular text or image data, inputting or entering data, or a combination thereof. In some embodiments, a client device is associated with a client device identifier. In some embodiments, a client device is a "consumer device," which is a client device used by a user to access the promotional system such as to view and, potentially, purchase promotions offered by merchants. In other embodiments, a client device is a "merchant device," which is a client device used by a merchant to access the promotional system.

As used herein, the term "client device identifier" refers to one or more data objects by which a client device is uniquely identified. For example, a client identifier may comprise ASCII text, a pointer, a memory address, a "tracking" cookie for a browser operated device, a native device identifier, a hardware/device serial number, or a combination thereof.

As used herein, the terms "provider" and "merchant" are used interchangeably and include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer or otherwise operating in the stream of commerce. The "provider" or "merchant" need not actually market a product or service via the promotional system, as some merchants or providers may utilize the promotional system only for the purpose of gathering marketing information, demographic information, or the like.

As used herein, the term "consumer" should be understood to refer to a recipient or a potential recipient of goods, services, promotions, media, or the like provided by the promotion and marketing service, a merchant, or both. In some embodiments, consumers are users who use client devices to access the promotional system such as to view and, potentially, purchase promotions offered by merchants through the promotional system. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. The parameters of a promotion are defined by promotion data. In some embodiments, the promotion data may define an inventory amount indicating the number of instances of a promotion that is available for purchase and/or other form of acceptance.

Promotions may have different values in different contexts. For example, a promotion may have a first value associated with the cost paid by a consumer, referred to as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

As used herein, the term "instrument" refers to the representation or embodiment of the terms of a promotion that may be used in a transaction for at least a portion of a purchase, acquisition, procurement, consumption or the like of goods, services and/or experiences. In some embodiments, instruments are provided to consumers as a result of a consumer purchase of a promotion, and the promotion may be redeemed via the use of the instruments. Instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "item" refers to various types of inventory that may be offered by the promotional system. For example, an item may include a promotion (e.g., specials, offers, etc.), coupon, market rate good (e.g., products, getaways, etc.), or other articles (e.g., gift cards, etc.). Items may be further defined by item parameters such as price, category, a particular product, service, or experience, etc. The promotional system offers items by sending data to client devices. The data causes the client devices to render tiles or item views related to the items offered by the promotional system and which provide information regarding the items and a means to purchase such items.

As used herein, the term "impression" refers to an electronically-generated communication, originating from a promotional system, that advertises an offer to purchase an item. For example, an impression comprises a communication, a display, or other perceived indication, such as a rectangular graphic, icon, tile, thumbnail, object included as part of a plurality of objects presented in rows and columns, flyer, print media, e-mail, text message, application alert, mobile applications, or other type of electronic interface or distribution channel and/or the like, of one or more promotions. An example of an impression, using the aforementioned restaurant as the example provider, is an e-mail communication sent to consumers that indicates the availability of a $25 for $50 toward a meal at the particular restaurant.

As used herein, the term "tile" refers to a data object or container for data, or an electronically-generated communication, that can be included within an interface. A tile is a specific type of impression. For example, a tile includes item data defining a promotion, category, collection, special, coupon, article/good (e.g., product, service, or experience), sale, etc. In some embodiments, a tile additionally includes presentation data such as images, videos, meta data, format data, layout data, etc. In some embodiments, a tile represents an area on a display or interface. A tile can represent a single item, or multiple items (e.g., a promotion and a collection offered together, an article and a video advertisement or informational presentation, etc.). The promotional system uses tiles to populate interfaces. In one embodiment, the promotional system sends to consumer devices interface data configured to cause the consumer devices to render different tile layouts associated with users that are in turn associated with different clusters of user behavior. In some embodiments, tiles may be ranked based on their relevance to a consumer, and then presented in a manner that is optimized or suitable for the particular type of consumer device (e.g., mobile or desktop) that the consumer is using to access the promotion and marketing service.

As used herein, the term "platform session" refers to an instance or a period of user activity associated with a website or a mobile application. For example, in one embodiment, a platform session begins when a client device sends data to a promotional system indicating that a user is requesting access to a website or mobile application associated with the promotional system. Conversely, a platform session ends when the user leaves the website, quits the mobile application, becomes idle (e.g., provides no user inputs for a pre-determined period of time), or purchases an item offered by the promotional system. A platform session is associated with and identified via a session identifier.

As used herein, the term "session records" refers to a plurality of data objects associated with a platform session and which are stored in a data repository such as a database. The session records include, at least, records of user inputs data collected during a platform session. The records comprise electronic information indicating content viewed, accessed, edited, or retrieved by a user during a session as well as whether a user executed a transaction during the platform session. The information or records are electronically processed and analyzed by a promotional system to cluster user behavior. For example, the session records include data associated with various types of user interactions, including without limitation, data associated with mouse clicks, data associated with mouse-over events such as data generated as a result of a mouse-over event or as a result of a mouse-over event occurring for a predetermined duration, the amount of time spent by the consumer viewing content during a session, data generated as a result of a user accessing or clicking a tile to access detailed information associated with an item, the rate at which impressions of particular content result in sales associated with that content, demographic information associated with each particular consumer, data indicating other content accessed by the consumer (e.g., browser cookie data), the time or date on which content was accessed, the frequency of impressions for particular content, data generated as a result of a user scrolling through content, data generated as a result of idle time, and/or the like. Session records may also include implicit data derived from any of the aforementioned data.

In at least one embodiment, the session records include data objects such as a session identifier, a user account identifier (associating the platform session to a user account), first-level platform engagement count, platform query count, second-level platform engagement count, platform output status indicator, and a session length. In some embodiments, the session records are stored as a row, a "session records row," in a sessions data table. Additional data may be appended to session records rows to store or associate additional information pertaining to a platform session.

As used herein, the term "sessions data" refers to a plurality of data objects associated with a plurality of platform sessions and which are stored in a data repository such as a database. In some embodiments, the sessions data is stored in a sessions data table comprising a plurality of rows and columns. In this embodiment, the plurality of rows comprise a plurality of session records rows.

As used herein, the term "session identifier" refers to one or more data objects by which a session may be uniquely identified. For example, a session identifier may comprise ASCII (American Standard Code for Information Exchange) text, a pointer, a memory address, and the like. In one embodiment, a promotional system generates a session identifier configured to capture, identify, or embody information such as one or more of a client device identifier, a client device version number, data indicative of a period of latest consumer activity, and/or one or more timestamps (e.g., time of creation, login, logout, or the like).

In some embodiments, a promotional system is configured to determine when to close a session. For example, as a consumer continues to navigate a website or mobile application, a host system captures user input data associated with consumer activity and continues to do so for the period of consumer activity. A "session timestamp", which is a data entity that is, in some embodiments, included in a session identifier for indicating a time of last consumer activity, may be updated at each instance of consumer activity as indicated by the user input data. However, when, for example, a consumer stops navigating the website or mobile application (such as for a pre-determined amount of time), the promotional system determines that there is no consumer activity due to the absence of user input. If a consumer returns to access a website or mobile application, the promotional system then determines, based on looking at the session timestamp, whether the consumer has returned within a period identified by a predetermined "session time" (e.g., 30 minutes).

A "session time" may be a predetermined time of inactivity in which the host system may determine that subsequent user input is part of the originally identified platform session. Here, for example, if the promotional system determines that the subsequent user input is within the session time, the promotional system determines that the activity associated with the user input is part of the originally identified platform session and that platform session may not be closed. However, if the user returns to access the website or open the mobile application after the time period identified by the predetermined session time, the promotional system may determine that the activity associated with the user is part of a subsequent platform session. In some embodiments, a new platform session is generated and the previous session is closed. In some embodiments, a predetermined session time may be one factor in a probabilistic determination of session identification. For example, in addition to utilizing session time, a promotional system may capture information related to session identification. Then, based on which information is captured and when the information is captured, the promotional system may determine whether to identify the information in a current session or start a new session, in some embodiments, the promotional system may be configured to factor associated confidence levels associated with the captured information into a probabilistic determination of whether the information should be identified as part of the current session or whether a new session should be created.

As used herein, the term "interactive promotional interface" refers to a window or modal or dedicated interface component that is rendered to a user of a client device and is configured to enable the user to access content such as information about promotions and other items offered by the promotional system. The interactive promotional interface presents to the user a plurality of tiles or impressions. Additionally, the interactive promotional interface enables user inputs such as search queries for items offered by the promotional system or user selections of specific tiles that in turn cause the rendering of an item view on the client device. The interactive promotional interface is presented on a display screen of a client device such as a consumer device. In some embodiments, user inputs received by the interactive promotional interface cause the client device to send user input data to a server of the promotional system. The functions described in this definition are example and should not be considered limiting of the interactive promotional interface. A person having ordinary skill would understand that the interactive user interface enables other types of user inputs and other functionalities in accordance with the rest of the disclosure provided herein.

In one embodiment, the interactive promotional interface may be configured differently depending on parameters associated with a user account. For example, if user of a client device is associated with a first user account that, in turn, is associated with a first cluster identifier, then the interactive promotional interface rendered to the user may have a first configuration. In one embodiment, the first configuration may comprise, for example, three tiles. On the other hand, if a user of a client device is associated with a second user account that, in turn, is associated with a second cluster identifier, then the interactive promotional interface rendered to the user may have a second configuration. In one embodiment, the second configuration may comprise, for example, eight tiles. Thus, in short, the interactive promotional interface may take different configurations according to the cluster identifier associated with the user account corresponding to a user of a client device.

As used herein, the term "query input component" refers to an object rendered via an interactive promotional interface which enables user inputs that result in a search query. In one embodiment, the query input component accepts input in the form of a string or a sequence of character values. In one embodiment, submitting a user input via the query input component causes a client device to send, to a server of the promotional system, search query data. In response to receiving the search query data, the server of the promotional system rinds content matching the user input (such as data comprising tiles of item views containing approximate or exact matches of the user input). Subsequently, the serve of the promotional system may send data comprising the search results to the client device, which utilizes the newly received data to render content for the user via the interactive promotional interface.

As used herein, the term "item view" comprises a tab or window or modal or an instance of a dedicated interface component that is rendered to a user of a client device via an interactive promotional interface. An item view comprises viewable information regarding an item offered via the promotional system such as a promotion, category, category, collection, special coupon, article/good (e.g., product, service, or experience), sale, etc. In some embodiments, an item view is rendered after a user selects, such as by clicking, tapping, or submitting keyboard inputs, a specific tile. Even though some of the information provided by a tile and an item view may overlap, an item view is configured to provide additional details not available in a tile. For example, an item view may provide means for viewing multiple images and videos regarding an item, ratings provided by other users of the promotional system, details regarding what is included with the item offered, details regarding a location or locations for redemption of a promotion, a price and quantity, consumer reviews, the time remaining on the offer (and thus the time remaining on the item's availability), and the like. In addition, in some embodiments, an item view includes an actuator button that enables a user to initiate a transaction for purchasing an item.

As used herein, the term "first-level platform engagement count" refers to a data object storing information that tracks the frequency with which users are provided with tiles or impressions during a platform session. For example, during a given platform session, a user of a client device may select and drag a scrolling component provided by an interactive promotional interface. In response, the interactive promotional interface is configured to cause a client device to render additional tiles for the user. In this scenario, the promotional system tracks the additionally rendered tiles via the first-level platform engagement count such that, at the end of the platform session, the first-level platform engagement count reflects the total number of tiles rendered for a user during the platform session. A person of ordinary skill in the art would recognize that other types of user inputs and other techniques exist to cause additional tiles to be rendered to a user, and the first-level platform engagement count is configured to track such additionally rendered tiles.

As used herein, the term "intermediate first-level platform engagement count" refers to a data object derived from a first-level platform engagement count. For example, in one embodiment, the intermediate first-level platform engagement count is determined by attenuating a first-level platform engagement count. In some embodiments, the same attenuation factor (otherwise referred to herein as a first-level platform engagement normalization factor) is applied to all first-level platform engagement counts stored in a data repository to obtain the intermediate first-level platform engagement counts. The intermediate first-level platform engagement count is utilized by a promotional system to produce a transformed first-level platform engagement count.

As used herein, the term "second-level platform engagement count" refers to a data object storing information that tracks the frequency with which users access item views during a platform session. For example, during a given platform session, a user of a client device may select a tile such as by clicking, tapping (on a touchscreen), or providing keyboard inputs. Selecting a tile causes a client device to render an item view corresponding to the selected tile, where the item view comprises additional information regarding an offered item. The promotional system is configured to track the number of times that a user provides user inputs to access item views such that by the end of a platform session, the second-level engagement platform session count reflects the total number of item views accessed by a user during the platform session.

As used herein, the term "platform query count" refers to a data object storing information that tracks the frequency with which users submit user inputs comprising search queries during a platform session. For example, during a given platform session, a user of a client device may submit input in the form of a string or a sequence of character values via a query input component. In some embodiments, the query input component is presented on an interactive promotional interface. The promotional system is configured to track the number of times that a user provides user inputs in the form of search queries such that by the end of a platform session, the platform query count reflects the total number of search queries submitted by a user during the platform session.

As used herein, the term "platform output status indicator" refers to a data object storing information that tracks whether a user input or series of user inputs caused a promotional system to output certain data. For example, during a given platform session, a user of a client device may initiate, via a series of user inputs, a transaction to purchase an item offered by the promotional system via tiles and item views. In some embodiments, an interactive promotional interface presents an actuator button that facilitates user purchase of an item. In this embodiment, the promotional system is configured to track, via a platform output status indicator, whether a user purchases an item during a platform session. In one embodiment, the platform output status indicator is a flag or Boolean variable taking two or more values, such as a 0 and a 1, which indicates at least the two possible states.

As used herein, the term "center of mass" refers to the average position of a plurality of points. For example, in one embodiment, a promotional system is configured to determine the center of mass of a cluster. To do so, the promotional system determines the average position of a plurality of platform sessions in a three-dimensional space. The platform sessions are, in this embodiment, associated with the cluster for which the promotional system is to determine a center of mass. In this embodiment, each platform session is represented in the three-dimensional space via session coordinates data comprising three values (or coordinates). In at least one embodiment, the coordinates data comprises transformed versions of the first-level platform engagement count, platform query count, and second-level platform engagement counts associated with a session identifier.

As used herein, the term "centroid" refers to a center of mass. In some embodiments disclosed herein, a centroid is associated with a cluster and comprises a representation of the cluster in a three-dimensional space. For example, in one embodiment, the centroid coordinates data associated with a cluster identifier define the centroid's position in the three-dimensional space.

As used herein, the term "centroid coordinates data" refers to a data object or data objects storing information related to a cluster. To that end, the centroid coordinates data is associated in a data repository to a cluster identifier. In one embodiment, the information stored by the centroid coordinates data comprises three values that a promotional system may utilize to represent a cluster in in a three-dimensional. The centroid coordinates data is used to associate a plurality of platform sessions to a cluster identifier.

As used herein, the term "cluster identifier" refers to a data to one or more data objects by which a cluster is uniquely referenced in a promotional system. For example, a cluster identifier may comprise ASCII text, a pointer, a memory address, or the like. In one embodiment, a cluster identifier is associated with centroid coordinates data which define a location of a cluster in a three-dimensional space.

As used herein, the term "discretionary data" refers to electronic information is received by a promotional system that comprises information voluntarily and explicitly provided by a user to the promotional system in support of improved interaction with the promotional system. Upon registering with the promotion and marketing service or at any time thereafter, the consumer or merchant may be invited to provide information that aids the promotional system in providing content that is targeted to the particular needs of the user. For example, a consumer may indicate interests, hobbies, their age, gender, or location when creating a new account. A merchant may indicate the type of goods or services provided, their retail storefront location, contact information, hours of operation, or the like.

It should be appreciated that the discretionary data is intended to refer to data received by a promotional system that comprises information voluntarily provided by a user. For example, a client device may send discretionary data to a server of the promotional system when a user completes a form or survey on a website or application hosted by the promotional system. However, it should be appreciated that the examples of discretionary data provided above may also be determined implicitly or through review or analysis of other electronic marketing information provided to the promotional system. In one embodiment, a user of a consumer device may be asked to provide information relating to their interests or location during a registration process. Once the user provides this information to the consumer device, the consumer device then sends the discretionary data to a server of the promotional system for processing and storing such as in relation to a user account.

As used herein, a "homepage" refers to a landing page, a first screen, homepage default interface, or the like that is rendered to a user of a consumer device when the user first accesses content through the promotional system. The promotional system may generate the interactive promotional interface data configured to cause the consumer device to render the homepage at least partially based on platform session records and a cluster identifier. For example, in some embodiments, the promotional system may be configured to provide different homepages that are optimized for a user based on the cluster identifier that is associated with the user's user account. Further, and to provide further context, the association between the cluster identifier and the user account may be at least partially based on platform session records associated with the user account and centroid coordinates data associated with the cluster identifier.

Overview

Various embodiments of the present disclosure generally relate to a method and apparatus for clustering platform sessions and user accounts associated with the platform sessions. The method and apparatus collect user inputs and other data from a platform session and store the data in a database. Because the stored platform sessions data comprises user inputs and data at least related to such user inputs, the platform sessions store data that provides insights into user behavior. Thus, the various embodiments of the present disclosure provide for a method and apparatus that identifies clusters of user behavior during platform sessions.

To that end, the apparatus collects data regarding the number of tiles presented to a user, search queries submitted by the user, and item views presented to a user during a platform session. Additionally, the apparatus may track the length of the platform session and whether the user purchases an item during the session. The apparatus optionally tracks other data during a platform session, such as whether a user has been idle. For example, if a user is idle for a pre-determined period of time, the platform session ends. Subsequently, if a user becomes active again (e.g., by submitting additional user inputs into the system), the apparatus initiates a new platform session for recording user inputs.

In this manner, by collecting a plurality of data during each platform session, the method and apparatus provide a database that is populated with many session records corresponding to the many platform sessions. Various embodiments of the present disclosure disclose a method and apparatus that utilizes these records to provide for a more efficient system and network.

For example, the disclosed apparatus, through various data transformations, transforms the collected session records into usable data for clustering platform sessions. Through applied effort and ingenuity, the data transformations utilize an attenuation factor to attenuate the number of tiles presented during each session. Subsequently, the apparatus transforms the attenuated number of tiles presented, the number of search queries submitted and the number of item views presented during each platform session to provide transformed data that can be used to map and cluster the session records data. In this manner, the present disclosure provides transformed data that can be used to map the platform sessions onto a three-dimensional space. There, each point in the three-dimensional space represents one platform session.

The apparatus may subsequently employ a clustering method for identifying clusters of platform sessions based on the transformed session records. There, the apparatus initializes data that defines the clusters to be identified and subsequently assigns a randomized initial position to each cluster in the three-dimensional space. The apparatus then finds, for each platform session, the nearest cluster to the platform session's position in the three-dimensional space. Thus, the apparatus associates each of the platform sessions to its nearest cluster. A consequence is that each cluster becomes associated with many platform sessions, each of which has a different location in the three-dimensional space.

Continuing with the clustering method, the apparatus is then configured to find, for each cluster, the average position of all platform sessions associated with the cluster. In one embodiment, the apparatus accomplishes this by determining the centers of mass corresponding to all the platform sessions associated with each of the clusters. Thus, the apparatus finds one center of mass per cluster, and subsequently modifies the position of each cluster in the three-dimensional space to match the center of mass calculated for the respective cluster.

The apparatus iteratively repeats the steps of (1) finding the nearest cluster for each platform session and then (2) assigning the position of each cluster to match the center of mass calculated for the cluster. The apparatus repeats such steps until the positions of all the clusters in the three-dimensional space remain unchanged. When the cluster positions become constant between successive iterations, then the apparatus has identified the clusters of platform sessions. In other words, the apparatus thus identifies clusters of user behavior based on data collected during many platform sessions.

The method and apparatus may be utilized for various purposes. For example, in one embodiment, the method and apparatus are used to segment the results of A/B experiments based on the identified clusters. This allows for A/B experiments that provide greater insight than could be accomplished without the aid of the identified clusters.

Similarly, the method and apparatus, in another embodiment, may provide for an improved method of providing interactive interfaces to users of a promotional system. For example, a promotional system may provide one interface configuration to users associated with one cluster (e.g., users who generally exhibit one type of user behavior) and may provide a different interface configuration to users associated with a second cluster. To provide additional context, in one embodiment, the apparatus may provide to a first user a first configuration of an interface that presents eight tiles in a single screen. This is advantageous when the first user is associated with a user account reflecting user behavior associated with a large number of tile views before effectuating a purchase.

On the other hand, in this same embodiment, the apparatus may provide to a second user a second configuration of the interface that presents three tiles in a single screen. This is advantageous when the second user is associated with a user account reflecting user behavior associated with a low number of tile views and, perhaps, a large number of search queries.

In this manner, the present disclosure provides for a promotional system that more effectively utilizes its resources, such as by sending large quantities of tiles data only to those users who effectively use the large amounts of tiles data and by configuring interfaces so that consumers more effectively utilize the features provided by the interface. Because the clustering of platform sessions allows for the utilization of resources that is targeted and more efficiently provided to users of the system, the present disclosure allows for an implementation of a promotional system that has reduced infrastructure requirements. For example, the processing load on the server of the promotional system is reduced as a result of the reduced amount of data needed to be generated, processed, manipulated, and transferred to client devices. Further, because the transmission of data is more efficiently targeted for transmission to those consumer devices that utilize the data effectively, the amount of data sent via a data network can be reduced, which results in a reduction of the data load imposed on the data network. Thus, as a consequence of the present disclosure, data networks may support communications between more systems while keeping the same digital bandwidth.

Among other features, these and other embodiments described herein at least: reflect improvements in the functioning of computing systems or devices, such as promotion and marketing services (including but not limited to promotional systems, servers, and databases), server devices, client devices, and combinations thereof; reflect improvements to other technologies or technical fields as described herein; and effect transformations or reductions of particular articles to different states or things, such as platform session records, other articles described herein, and combinations thereof. In addition, the embodiments described herein provide for improved networked systems that reduce the amount of data transferred via the network and allow for more efficient systems that have reduced infrastructure requirements and improved performance.

System Architecture and Example Apparatus

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, wearable device (e.g., smart glasses, smart watch, virtual reality headset, etc.) or any combination of the aforementioned device.

In this regard, FIG. 1 shows an example computing system within which embodiments of the present disclosure may operate. Consumers and merchants may access a promotion and marketing service from a promotional system 102 via a network 112 (e.g., the Internet, or the like) using consumer devices 108A through 108N and merchant devices 110A through 110N, respectively (e.g., one or more consumer devices 108A-108N or one or more merchant devices 110A-110N). Moreover, the promotional system 102 may comprise a promotional server 104 and a promotional database 106.

The promotional server 104 may be embodied as a single computer or multiple computers. The promotional server 104 may be configured to provide the promotion and marketing service. For example, the promotional server 104 may provide for receiving of electronic data from various sources, including but not necessarily limited to the consumer devices 108A-108N and the merchant devices 110A-110N. The promotional server 104 may be operable to receive and process user inputs provided by the consumer devices 108 and/or the merchant devices 110. The promotional server 104 may also facilitate e-commerce transactions based on transaction information provided by the consumer devices 108 and/or the merchant devices 110. The promotional server 104 may facilitate the generation and providing of various electronically-generated communications and/or electronic user interfaces based on the received electronic data (e.g., electronic marketing data, etc.). Although a single promotional server 104 is shown, promotional system 102 may include one or more promotional servers 104. In some embodiments, one or more promotional servers 104 may include a session management circuitry 210, clustering circuitry 212, and/or an optional A/B testing circuitry 214 as shown in FIG. 2.

Returning to FIG. 1, promotional database 106 may be embodied as a data storage device such as a Network Attached Storage (NAS) device or devices, or as a separate database server or servers. The promotional database 106 includes information accessed and stored by the promotional server 104 to facilitate the operations of the promotional system 102. For example, the promotional database 106 may include, without limitation, electronic marketing information, user account credentials for system administrators, merchants, and consumers, item data indicating items (e.g., promotions, market rate goods, coupons, articles, etc.) offered by the promotion and marketing service, consumer account and/or other consumer data, clickstream data, analytic results, reports, financial data, and/or the like. In some embodiments, promotional database 106 may represent one or more databases storing some or all of the data discussed herein.

The consumer devices 108A-108N may be embodied by one or more computing devices and, in some instances, may be embodied as one or more specialized circuitries, computers, or computing systems configured to perform various functions described herein. Each of the consumer devices 108A-108N may be operated by, or associated with, a consumer. Electronic data received by the promotional server 104 from the consumer devices 108A-108N may be provided in various forms and via various methods. For example, the consumer devices 108A-108N may include desktop computers, laptop computers, smartphones, netbooks, tablet computers, wearables, and the like. The electronic data may be provided through various sources on these consumer devices.

In embodiments where a consumer device 108 is a mobile device, such as a smart phone or tablet, the consumer device 108 may execute an "app" to interact with the promotional system 102. Such apps are typically designed to execute on mobile devices, such as tablets or smartphones. For example, an app may be provided that executes on mobile device operating systems such as Apple Inc.'s iOS®, Google Inc.'s Android®, or Microsoft inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotional system 102 may leverage the application framework offered by the mobile operating system to allow consumers to designate which information is provided to the app and which may then be provided to the promotional system 102. In some embodiments, consumers may "opt in" to provide particular data to the promotional system 102 in exchange for a benefit, such as improved relevancy of marketing communications offered to the user. In some embodiments, the consumer may be provided with privacy information and other terms and conditions related to the information provided to the promotional system 102 during installation or use of the app. Once the consumer provides access to a particular feature of the mobile device, information derived from that feature may be provided to the promotional system 102 to improve the quality of the consumer's interactions with the promotion and marketing service.

For example, the consumer may indicate that they wish to provide location information to the app from location services circuitry included in their mobile device. Providing this information to the promotional system 102 may enable the promotional system 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotional system 102. For example, the consumer may decide at a later point to disable the ability of the app to access the location services circuitry, thus limiting the access of the consumer's location information to the promotional system 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotional system 102 via a web browser. As yet another example, the consumer device 108 may include various hardware or firmware designed to interface with the promotional system 102 (e.g., where the consumer device 108 is a purpose-built device offered for the primary purpose of communicating with the promotional system 102, such as a store kiosk).

The consumer device 108 may be configured to execute a mobile application including multiple service applications.

Each service application may be configured to execute in a separate "container," including a unique thread and execution context. As such, the mobile application provides multi-threading performance on a mobile device. The mobile application may be defined with respect to a dependency tree. The dependency tree is a data structure that defines startup and shutdown dependencies among the service applications of the mobile application. When a particular service application is needed, the consumer device 108 may be configured to determine one or more parent service applications of the service application from the dependency tree, and startup each parent service application (e.g., that is not already started) in an order defined by the dependency tree. Similarly, when a particular service application is not needed and thus can be shutdown (e.g., to preserve computing resources), the service application as well as one or more parent service applications that are no longer be used (e.g., as a dependency) may also be shut down in an order defined by the dependency tree. Within each service, the code may be single-threaded, which makes for easily understandable and maintainable code. For the mobile application as a whole, each service application runs using its own (e.g., JavaScript) core and its own thread to create a multi-threaded network of service applications executing on the consumer device 108.

In some embodiments, the mobile application may be a mobile consumer application configured to interface with the promotional system 102. Here, each service application may be associated with a particular functionality, such as the generation of a particular application page of the mobile consumer application. For example, a first service application may be configured to provide a homepage, a second service application may be configured to provide a promotion detail page, a third service application may be configured to provide a redemption information page, and so forth. The various pages may include links or references to each other, which may be used a basis for the defined dependencies within the dependency tree. For example, the homepage provided by a first service application executing in a first thread may include links to one or more promotions. In response to selection of a link of a promotion, a promotion detail page for the promotion may be generated by a second service application (e.g., a promotion detail page service application) executing in a second thread, and provided to a user interface of the consumer device 108. As such, execution of the first service application may require startup of the second service application dependency.

The service applications may be configured to utilize a service orientated architecture (SOA) or microservices architecture pattern. The service applications may be configured to facilitate messaging, startup, shutdown, and coordination among each other. The services applications may operate like servers that wait in a listening state, and interact and trigger executions through RESTful contracts. In accordance with the SOA design, the service applications may include the following properties: (1) explicit functional boundaries, (2) autonomous services that do not access the memory space, dependencies, etc., (3) service applications share schema and contract, not class, and (4) service compatibility is based on policy.

For example, a first service application may generate and send a request to execute a second service application, which initiates the execution of the second service application. Furthermore, any service application dependencies of the second service application that have not been started may be started prior to execution of the second service application. In the context of a consumer mobile application, a service application may be dedicated to generating a promotion detail page within the user interface. Here, when the promotion detail page is to be displayed within the user interface, a call can be made to a promotion detail page service to display the promotion detail page, and the required information (e.g., a promotion identifier) may be passed to the service application as part of the call.

A particular service application may also be requested in ways other than another service action, such as by an external application or device. For example, the consumer device 108 may be configured to determine to execute a service application (e.g., a promotion detail page of a promotion) in response to user selection of a link, button, or reference (e.g., associated with the promotion) in an electronic marketing communication (e.g., email, text message, application message, mobile push alert, etc.) provided to the consumer device 108 from the promotional system 102. Only the referenced service application and parent service application dependencies need to be started, while other service applications or portions of the mobile application may remain or be shutdown. Once started, a similar call can be made to the promotion detail page service application, including the promotion identifier associated with the selected link, button or reference.

The different service applications may be developed separately, such as by different developers or teams. In some embodiments, service applications may be coded with a standard mobile application code format that is supported across multiple mobile device operating systems. For example, the React Native framework may be used to allow developers to code in JavaScript but produce native user interfaces on both iOS and Android mobile operating systems. In another example, an HTML5-based framework or AngularJS may be used as the standard mobile application code format. Native user interfaces allow for responsive, fluid applications akin (e.g., from a user perspective) to applications coded in native mobile operating system code format or language. Advantageously, the mobile application may employ the standard mobile application code format within the service applications such that a significant portion (e.g., 80-90%, in one example) of the service applications share a codebase compatible with multiple mobile operating systems (e.g., iOS and Android). Thus duplications in mobile application development can be avoided. For example, rather than developing two applications having entirely different code base for iOS and Android, and thus resulting in slow release cycles with heavy verification efforts for each version release, a single code base and verification can be performed for one or more service application using a standard mobile application code format. In some embodiments, service applications configured to generate and provide an application page for the user interface of the consumer device 108 may rely on React Native as the standard mobile application code format supported across multiple mobile device operating systems.

In some embodiments, at least two service applications of a mobile application may be coded using different programming code formats or languages. Because service applications execute in separate containers and interact using service calls (e.g., RESTful contracts) of defined outputs and inputs, interoperability across programming languages is possible within a single mobile application, such as even when internal programming (e.g., functions, sub-functions, user interface components, etc.) of a service application is modified or updated. Advantageously, distributed developers or development teams may work efficiently while minimizing the introduction of incompatible code.

In some embodiments, a mobile application native codebase (e.g., compatible with a single mobile OS) may be transformed from a monolithic architecture to a SOA. For example, a mobile application configured to provide multiple application pages may be converted on a page-by-page basis where functionality associated with each application page is implemented within a separate service application. Furthermore, each service application may be implemented using a standard mobile application code format, such as in JavaScript using React Native. As such, the service applications for each application page uses a standard mobile application code format. Native routing code may be added to the mobile application to handle routing between native code and the service application pages seamlessly. For example, a "display" status parameter may be tracked and updated by the native routing code to control which service application, and associated page, is presented to the user interface.

Subsequent to conversion from native to the standard mobile application code format, A/B testing may be performed on application pages as modified relative to the native pages. The A/B testing may be designed to evaluate areas such as user interaction (e.g., how frequently the user interacts with the re-implemented page compared to the native page, whether a re-implemented page causes a user to purchase items at a higher rate than the native page, whether sessions are longer a re-implemented page compared to the native page, etc.), page performance (e.g., how fast the re-implemented page loads or reacts to user inputs compared to the native page), overall application performance (e.g., how fast the modified application boots up compared to the native application, memory usage-because high memory usage means the operating system will reject the application from memory more often, leading to more cold starts), developer experience (e.g., how easily development is using these technologies compared with existing technologies), code sharing (e.g., how much code can or should most use service applications to achieve best performance), etc.

The merchant devices 110A-110N may be embodied by one or more computing devices and, in some instances, may be embodied as one or more specialized circuitries, computers, or computing systems configured to perform various functions described herein. Each of the merchant devices 110A-110N may be operated by, or associated with, a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotional system 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotional system 102 to enable the promotional system 102 to generate promotions or other marketing information to be provided to consumers.

Example Apparatuses for Implementing Various Embodiments

The promotional server 104, consumer device 108 and/or merchant device 110 may be embodied by one or more computing systems, such as apparatus 200 shown in FIG. 2.

As illustrated in FIG. 2, the apparatus 200 may include a processor 202, a memory 204, an input/output circuitry 206, communications circuitry 208, session management circuitry 210, and clustering circuitry 212, and optional A/B testing circuitry 214. The apparatus 200 may be configured to execute the operations described herein. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The session management circuitry 210 includes hardware configured to generate and provide data comprising electronically-generated communications for the consumer devices. In some embodiments, the session management circuitry 210 may be configured to provide the functionality discussed herein with respect to providing impressions, deal views, and associated interfaces to consumer devices. Additionally, the session management circuitry includes hardware configured to generate session records indicating content viewed, accessed, edited, or retrieved by a user during a session as well as whether a user executed a transaction during said session.

The clustering circuitry 212 includes hardware configured to generate and provide clusters based on the session records. In some embodiments, the clustering circuitry 212 is configured to retrieve session records from memory 204 and to generate data comprising information regarding clusters of user behavior, which is data that is subsequently stored in memory 204.

The optional A/B testing circuitry 214 includes hardware configured to enable users to generate A/B tests. For example, the A/B testing circuitry 214 includes hardware configured to provide the functionality discussed herein with respect to providing re-implemented pages that differ from the native page. In at least one embodiment, the A/B testing circuitry 214 may use the results of the clustering circuitry to enable user selection of clusters of user behavior to generate the A/B tests. To that end, the clustering circuitry provides the functionality of a merchant interface that enables user-configuration of the A/B testing.

The session management circuitry 210, clustering circuitry 212, A/B testing circuitry 214, or a combination thereof may utilize processing circuitry, such as the processor 202, to perform the actions described above and further disclosed herein. However, it should also be appreciated that, in some embodiments, the session management circuitry 210, clustering circuitry 212, A/B testing circuitry 214, or a combination thereof may include a separate processor, specially configured field programmable gate array (FPGA), or application specific interface circuit (ASIC). The session management circuitry 210, clustering circuitry 212, A/B testing circuitry 214, or a combination thereof may therefore be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks. CD-ROMs, flash memory, optical storage devices, or magnetic storage devices.

Overview of Clustering User Behavior Based on Platform

FIG. 3 shows a flow chart of an example method 300) for clustering user behavior based on platform sessions. Method 3000 is meant to show a high level example, while some of the other processes flows discussed herein show more detailed examples.

At 3200, the promotional system is configured to collect and store session records. To provide further context, a user may access the promotional system 102 via various platforms such as via a webpage or an app executing on a consumer device. In this manner, the consumer device may send and receive data to and from the promotional system 102. Further, the consumer device is configured to enable user interactions with the promotional system via user inputs into the consumer device. In one embodiment, the user interactions are provided to the consumer device via a rendered interactive promotional interface.

For example, in one embodiment, a user may access, utilizing a consumer device, a specific URL (Uniform Resource Locator) hosted by promotional server 104. Promotional server 104, in response to receiving an HTTP (Hypertext Transfer Protocol) request associated with the user input comprising an attempt to access the specific URL may send to the consumer device interactive promotional interface data. The interactive promotional interface data causes the consumer device to display an interactive promotional interface, which is configured to provide a promotion and marketing service to the user. In some embodiments, the interactive promotional interface comprises at least a plurality of tiles, a query input component and item views.

The promotional system is configured to track user behavior in the form of user inputs. To that end, the promotional system generates session records in the form of session records rows that are stored in a data repository and that become associated with a platform session. For example, when promotional server 104 first receives the HTTP request associated with the user input comprising an attempt to access the URL where the promotion and marketing service is hosted, the promotional server 104 initiates a platform session. Promotional server 104, thus generates a session record row. In some embodiments, the session records row comprises a user account identifier if one is available, a session identifier, a timestamp associated with the user input indicating a time of last user activity, a variety of user input counters, and the like. Further, after the promotional server 104 initiates the platform session, the promotional server 104 begins collecting data associated with the platform session. A platform session ends, and the promotional server 104 terminates the collection of data associated with a platform identifier, when a user completes a transaction to purchase an item offered via the promotion and marketing service. The platform session also ends when a user closes the webpage providing the interactive user interface or becomes idle (e.g., the promotional server 104 stops receiving user inputs) for a predetermined amount of time.

To provide further context regarding the data collection, promotional server 104 is configured to make a determination, based on the interactive promotional interface data sent to the consumer device, regarding the number of tiles that a consumer device presents to a user during a platform session. For each of the presented tiles, promotional server 104 increases a counter and stores it as part of the session records row. In one embodiment, the value is stored in a first-level platform interaction count, which is part of a session records row. In one embodiment, a user input comprising a scrolling action associated with a user increases the first-level platform interaction count.

As another example, promotional server 104 is configured to make a determination regarding the number of searches submitted by a user via the interactive promotional interface. For example, in one embodiment, the interactive promotional interface provides a query input component that enables user input in the form of a string. In this embodiment, submitting a string via the query input component causes promotional server 104 to increase a counter that keeps track of the number of such search queries occurring during a platform session. Thus, promotional server 104 tracks the number of search queries via a counter such as a platform query count that forms part of a session records row.

Similarly, promotional server 104 is configured to keep track of the number of times that it receives a user input comprising a request to access an item view. For example, the interactive promotional interface enables users to select, for example by clicking (via a computer mouse) or tapping (via a touchscreen), a tile. Such user selection of a tile causes the interactive promotional interface to then display an item view associated with the selected tile. Thus, promotional server 104 is configured to track the number of times that a user accesses item views during a platform session. Promotional server 104 may do so via a second-level platform count that forms part of a session records row.

A person having ordinary skill in the art would appreciate that promotional server 104 may track other aspects of a platform session and generate a record of such aspect. For example, promotional server 104 may be configured to track the duration of a platform session, data associated with mouse-over events such as data generated as a result of a mouse-over event occurring over a tile, the rate at which impressions of particular content result in sales associated with that content, demographic information associated with each particular consumer, data indicating other content accessed by the consumer (e.g., browser cookie data), the time or date on which content was accessed, the frequency of impressions for particular content, data generated as a result of a user scrolling through content, data generated as a result of idle time, and/or the like.

At 3300, the promotional system 102 generates session coordinates data and optionally maps platform sessions in a three-dimensional space. To provide further context, promotional server 104 utilizes the session records rows generated at 3200 to generate transformed session records data. Promotional server 104 may use the transformed session records data to generate session coordinates data that represent locations of a plurality of platform sessions in a three-dimensional space.

To provide further context, in one embodiment, to generate session coordinates data for a platform session, promotional server 104 retrieves from a data repository the first-level platform interaction count, platform query count, and second-level platform interaction count corresponding to the platform session. Subsequently, promotional server 104 transforms the retrieved data by employing various computations that transform the retrieved data into useful values for a clustering process. Promotional server 104 thus generates, based on the retrieved data, session coordinates data that represents the platform session in a three-dimensional space. The data transformations may be necessary, in some embodiments, because promotional server 104 may initially store the session records rows in a form that does not permit proper clustering of user behaviors.

Promotional server 104, after carrying out a series of transformation steps, may map the session coordinates data in a three-dimensional space that contains the session coordinates data for all platform sessions included in a data repository. Each set of session coordinates data represents one point in the three-dimensional space, and thus each point represents one platform session and, consequently, its corresponding user behavior as reflected by the user inputs recorded in the platform session records row.

At 3400, promotional server 104 generates cluster-defining data. Promotional server 104 generates cluster-defining data based on the mapping of platform sessions in the three dimensional space. Thus, the cluster-defining data depends on the plurality of points that represent the platform sessions in the three-dimensional space. To provide further context, promotional server 104 first determines a number of clusters to be identified. Subsequently, promotional server 104 may employ a clustering method to find clusters of user behavior as represented by the plurality of points that represent platform sessions in the three-dimensional space. The clusters comprise groups of points (or session coordinates data)

that are positioned close together. Thus, the clusters comprise groups of user behavior that are similar to each other.

At 3500, promotional server 104 associates user accounts with clusters based on session data (e.g., session coordinates data) and the cluster data. As previously discussed, promotional server 104 is configured to track user behavior in the form of user inputs and user interactions with an interactive promotional interface. Promotional server 104 is thus configured to store session records associated with users by associating the session records with a user account identifier. In this manner, promotional server 104 may utilize the cluster data generated at 3400 to associate a user account identifier with one of the identified clusters.

The promotional system 102 may use the association of user accounts with clusters for various purposes. For example, the promotional system 102 may customize the interactive promotional interface for users based on the cluster with which their user accounts are associated. Similarly, the promotional system 102 may generate A/B tests configured to evaluate user interactions utilizing re-implemented interfaces that are targeted for users associated with specific clusters.

Collecting Session Records and Generating Session Coordinates Data

FIG. 4 shows flow chart of an example method 4000 for generating session coordinates data and optionally map platform sessions in a three-dimensional space.

At 4200, promotional server 104 accesses, from the data repository, sessions data associated with the platform sessions, where the sessions data comprises a plurality of session records, and each session record comprises a session identifier, a first-level platform engagement count, a second-level platform engagement count, a platform query count, and platform output status indicator. The data repository may be embodied as a database such as promotional database 106 shown in FIG. 1. As previously discussed, promotional server 104 is configured to collect and store session records associated with a platform session. In one embodiment the session records are stored as rows of a sessions data table in the data repository. For example, FIG. 6 shows an example sessions data table that is stored in a data repository such as promotional database 106. With reference to FIG. 6, a row comprising session records 608 includes a session identifier 601, user account identifier 602, first-level platform engagement count 603, platform query count 604, second-level platform engagement count 605, platform output status indicator 606, and session length 607.

A session identifier is a data object that uniquely identifies a platform session initiated by a user of a consumer device 108. Promotional server 104 is thus configured to collect and store in the session records various data of interest regarding a platform session. In the particular embodiment of FIG. 6, the session records 608 includes a user account identifier that uniquely identifies a user account associated with a user of the promotional system 102. In one embodiment, promotional server 104 associates a platform session with a user account identifier after a user of a consumer device 108 logs into the promotional system. For example, in one embodiment, promotional system 102 may send to the consumer device 108 log-in interface data configured to cause the consumer device 108 to render a log-in interface. Thus, the consumer device 108 enables a user to provide a user account name and a user account password, and/or other credentials, to authenticate the identity of the user. In this embodiment, after the user provides to the promotional system the log-in information, promotional server 104 then generates a session records row like the row comprising session records 608, a platform session identifier like the session identifier 601, and further includes the user account identifier associated with the received log-in information and stores it as the user account identifier 602. In addition, in one embodiment, promotional server 104 initializes row data objects 603-607. The initialization may comprise assigning null values or zero values to each of the row data objects 603-607.

A first-level platform engagement count 603 is a data object that identifies the number of tiles rendered via a display of a consumer device 108. Promotional server 104 is thus configured to track the number of tiles presented via the interactive promotional interface for a user. For example, after a user logs into the promotional system, promotional server 104 sends to the consumer device 108 interactive promotional interface data configured to cause the consumer device 108 to render an interactive promotional interface. In one embodiment, immediately after the user provides log-in credentials, the interactive promotional interface data is configured to cause the consumer device 108 to render a homepage. FIG. 7 shows an example embodiment of a homepage being displayed as part of an interactive promotional interface. In the specific embodiment of FIG. 7, the consumer device 108 is shown as displaying seven tiles 701-707. Thus, in this particular embodiment of a homepage, promotional server 104 would thus determine that the platform session has been associated with seven tiles that have been rendered via a display of the consumer device 108. Consequently, promotional server 104 modifies the first-level platform engagement count 603 to include a value representing that seven tiles have been presented during the platform session.

As the platform session continues beyond the initial homepage display, promotional server 104 is configured to update the first-level platform engagement count. For example, with reference to FIG. 7, the user may click on scrolling component 708 and drag it downwards to view additional tiles included in the homepage. Promotional server 104 consequently updates the first-level platform engagement count 603 to reflect the additional tiles that have been presented via the consumer device 108 during the platform session.

A platform query count 604 is a data object that identifies the number of search queries that a user submits during a platform session. For example, with reference to FIG. 7, a query input component 709 is provided via the interactive promotional interface which enables a user to input as string or sequence of characters. In the embodiment shown in FIG. 7, the user of a consumer device 108 may enter, for example, a string such as "oil change" into the query input component. After the user submits the search query, such as by pressing a button on a keyboard (e.g., a return button on a keyboard) or otherwise activating actuator button 710, the interactive promotional interface renders the results of the search query. In such a scenario, promotional server 104 updates the platform query count 604 to reflect that a search query has been submitted during the platform session. If no previous search queries had been submitted, then promotional server 104 modifies the platform query count 604 with a value that reflects that one search query has been submitted during the session. Subsequent search queries would cause promotional server 104 to increase the platform query count 604 accordingly.

For example, FIG. 8 shows one example embodiment of an interactive promotional interface rendered via a consumer device 108 after a user submits a search query. In this embodiment, query input component 801 shows that the string, "oil change," was submitted by a user and therefore received by promotional server 104. Further, this embodiment shows the consumer device 108 as rendering tiles 802-806 for the user. Accordingly, in this embodiment, subsequent to receiving the data comprising the query input and subsequent to sending the interactive promotional interface data configured to present tiles 802-806 via a consumer device 108, promotional server 104 updates first-level platform engagement count 603 to reflect that an additional set of five tiles has been rendered during the platform session.

A second-level platform engagement count 605 is a data object that identifies the number of times that a user accesses an item view comprising detailed information about an item being offered by the promotional system. For example, with reference to the embodiment of the interactive promotional interface shown in FIG. 8, a user may select, via a mouse-click or a screen tap or a keyboard input, tile 805. In response to such user input, consumer device 108 sends to promotional server 104 data comprising the user selection of tile 805. Promotional server 104 is thus configured to send, to consumer device 108, interactive promotional interface data configured to cause the consumer device 108 to render an item view.

For example, FIG. 9 shows an example embodiment of an interactive promotional interface presenting an item view associated with tile 805. The item view includes details regarding the item offered. For example, FIG. 9 includes customer reviews, details regarding what the offer includes, the number of such offers previously purchased by other users, the location for redemption, and the like. Promotional server 104, in addition to sending interactive promotional interface data to the consumer device 108, updates a second-level platform engagement count 605 to reflect that the user has accessed an item view during the platform session. As the user browses for more items through the interactive promotional interface, subsequent user inputs comprising requests to access item views cause promotional server 104 to accordingly update the second-level platform engagement count 605.

A platform output status indicator 606 is a data object that identifies whether a user purchased an item during a platform session. In one embodiment, platform output status indicator 606 is a Boolean variable that can take one of two values: a one (or "true") and a zero (or "false"). In some embodiments, platform output status indicator 606 is initialized with a value of zero (or "false"). Subsequently, if a user purchases an item during a platform session, promotional server 104 modifies the platform output status indicator 606 into a 1 (or "true"). For example, with reference to the embodiment shown in FIG. 9, a user may activate actuator button 901, which initiates a transaction process. As part of the transaction process, the interactive promotional interface may ask a user to provide payment in exchange for receiving the offered item. Further details of the transaction process are hereby omitted to avoid overcomplicating this disclosure. However, if the user completes the transaction process, promotional server 104 then updates platform output status indicator 606 to a 1 (or "true). Additionally, after the completion of the transaction, promotional server 104 ends the platform session and determines the length of time of the platform session. For example, in one embodiment, promotional server 104 may be configured to initiate a timer when the platform session is initiated and then record the value of the timer when the platform session is terminated. Promotional server 104 stores the duration a platform session in session length 607.

Returning to method 4000, at 4300, promotional server 104 retrieves, from the data repository and for each session record, the first-level platform engagement count to generate an intermediate first-level platform engagement count, the intermediate first-level platform engagement count being at least partially determined by dividing the first-level platform engagement count by a first-level platform engagement normalization factor (otherwise referred to herein as an attenuation factor), wherein the first-level platform engagement normalization factor is common among all session records.

To provide further context, step 4300 comprises promotional server 104 accessing a data repository such as one embodied by promotional database 106 to retrieve data comprising information about the number of tiles that a consumer device 108 rendered during a platform session (e.g., the stored first-level platform engagement count 603). Subsequently, promotional server 104 generates an intermediate first-level platform engagement count, which promotional server 104 generates by dividing the value stored in the first-level platform engagement count 603 stored. To that end, promotional server 104 uses a divisor configured to reduce the bias caused by or the undue weight of the first-level platform engagement count in a process for clustering user behavior.

To be more specific, in some embodiments of an interactive promotional interface, during any given session, the number of tiles presented to a user largely outnumbers the number of times that a user submits search queries and the number of times that a user accesses item views. Thus, clustering user behavior without attenuating the value of the first-level platform engagement count 603 would result in the first-level platform engagement count 603 becoming the determining factor when promotional server 104 performs the computations designed to identify clusters of user behavior based on platform sessions data. Such a result may be desirable in some embodiments such as when promotional server 104 is used to cluster user behavior based only on the number of tiles presented for a user during a session. A person having ordinary skill in the art would recognize that such a result would also be desirable in other embodiments where promotional server 104 is used to cluster user behavior based on user inputs that are expected to have a similar order of magnitude as the expected number of tiles to be presented to a user during a session.

However, in other embodiments, attenuating the effect of the first-level platform engagement counts, such as 603, becomes necessary. This is especially true when the first-level platform engagement counts are orders of magnitude larger than other factors considered during the clustering process. For example, the table reproduced below provides one specific example embodiment where attenuating a first-level platform engagement count is appropriate because the first-level platform engagement count (labeled "tile") is one order of magnitude larger than the other factors:

| Session ID | item view | search | tile | purchase |
| --- | --- | --- | --- | --- |
| 0fdff1be-16c8-4053-a668-00669619c105 | 0 | 0 | 20 | 0 |
| 107ec8ec-6a7e-4a85-a00b-edaae79c59c4 | 0 | 1 | 41 | 0 |
| 109bedfd-0e9e-49a9-9781-bfc6685884e1 | 0 | 0 | 22 | 0 |
| 10dcbf92-e0bc-441e-8ed7-18f07c0eaf0e | 6 | 0 | 21 | 0 |
| 1139f800-3a92-463e-9491-7d90edf865e7 | 2 | 7 | 12 | 1 |
| ... | ... | ... | ... | ... |

In this embodiment, promotional server 104 is used to cluster user behavior based on the first-level platform engagement counts 603, second-level platform engagement counts 605, and platform query counts 604 that are associated with a plurality of rows comprising respective session records 608. In such an embodiment, to obtain a meaningful set of clusters of user behavior, promotional server 104 attenuates the first-level platform engagement counts 603. In some embodiments, promotional server 104 attenuates the first-level platform engagement counts 603 by dividing each of the values stored in each of the first-level platform engagement counts 603 by a common divisor or normalization factor (e.g., the same divisor is used across all of the respective session records 608). In one embodiment, the common normalization factor is a pre-determined value stored (such as 20) in the data repository. However, in other embodiments, promotional server 104 may determine the appropriate value of the normalization factor by analyzing the sessions data and finding an optimized normalization factor.

At 4400, promotional server 104 then stores, in the data repository and for each session record, the intermediate first-level platform engagement count and associates the intermediate first-level platform engagement count with a session identifier. In other words, promotional server 104 stores the intermediate first-level platform engagement count in the data repository. In some embodiments, promotional server 104 stores the intermediate first-level platform engagement counts in an additional column of the sessions data table so as to extend each row corresponding to a row comprising session records 608. In other embodiments, promotional server 104 generates a new data structure that associates the intermediate first-level platform engagement count with a session identifier. Regardless of the storing method, at the end of step 4400, the data repository, such as promotional database 106, stores an intermediate first-level platform engagement count for each of the platform sessions, where the platform sessions and the new data are associated with each other at least via a session identifier.

At 4500, promotional server 104 retrieves, from the data repository and for each session record, the second-level platform engagement count, the platform query count, and the intermediate first-level platform engagement count to generate transformed session records data. Promotional server 104 generates the transformed session records data by transforming each of the retrieved data to obtain a transformed second-level platform engagement count, transformed platform query count, and transformed first-level platform engagement count. To do so, promotional server 104 first determines, for each session records 608, a session-specific normalization factor. In one embodiment, promotional server 104 generates the session-specific normalization factor by summing the second-level platform engagement count, the platform query count, and the intermediate first-level platform engagement count corresponding to each of the session records 608. Promotional server 104 may optionally store the session-specific normalization factor in the data repository such as by adding one more columns to the sessions data table (e.g., by appending the session-specific normalization factor to its corresponding session records row)

After generating all the sessions-specific normalization factors, promotional server 104 then generates each of the transformed second-level platform engagement counts for each of the session records 608 by dividing the values stored in the second-level platform engagement counts 605 by the session-specific normalization factor. Similarly, promotional server 104 generates the transformed platform query count by dividing the value stored in the platform query count 604 by the session-specific normalization factor.

Further, Promotional server 104 generates a transformed first-level platform engagement count using a slightly different technique. There, promotional server 104 divides the values stored in the intermediate first-level platform engagement count by the session-specific normalization factor.

At 4600, promotional server 104 stores, in the data repository and for each session record, the transformed session records data. In some embodiments, promotional server 104 stores the transformed session records data for each session records 608 immediately after generating the transformed session records data. In this manner, promotional server 104 performs steps 4500 and 4600 consecutively for one row of session records 608 before moving on to performing steps 4500 and 4600 for a subsequent row of session records 608. In other embodiments, promotional server 104 first performs step 4500 for all rows of session records 608 and then performs step 4600 for all rows of session records 608. A person having ordinary skill in the art would recognize that this disclosure contemplates these and other alterations in the steps discussed with regards to method 4000.

Additionally, after 4600, promotional server 104, in some embodiments, then generates a set of session coordinates data for each of the session records 608. The set of session coordinates data comprises three values that define a location in a three-dimensional space. In one embodiment, the three values for each of the session records 608 comprise the transformed first-level platform engagement count, transformed platform query count, and transformed second-level platform engagement count. A person having ordinary skill would recognize that the session coordinates data may be stored using various formats. For example, the session coordinates data may be stored as a single entry in a table such as the sessions data table shown in FIG. 6, three different entries in a table such as the sessions data table shown in FIG. 6, or may be stored in other locations or data structures in a database repository. However, separately storing the session coordinates data for each of the session records 608 is not strictly necessary since the information defining the session coordinates data is stored in the data repository after step 4600.

At 4700, promotional server 104 retrieves and maps, for each session record, the transformed session records onto a three-dimensional space. For example, in one embodiment, mapping the transformed session records onto a three-dimensional space comprises the step of generating a table representing the three-dimensional space where platform sessions are represented via session coordinates data comprising the transformed session records data. Such a table is populated with the transformed session records data and the session identifiers corresponding to all the represented and stored platform sessions. Additionally, the table may comprise the centroid coordinates data associated with clusters that will be discussed in more detail herein, the corresponding cluster identifiers, and indicators for keeping track of whether a row corresponds to a platform session or a cluster.

In other embodiments, mapping the session records comprises generating a three-dimensional graph or plot comprising three axes: (1) a first-level platform engagement count axis, (2) a platform query count axis, and (3) a second-level platform engagement count axis. Mapping the session records thus comprises plotting a plurality of points representing platform sessions. Promotional server 104 determines the location of each of the points based on the transformed session records data corresponding to each of the platform sessions stored in the data repository. For example, FIGS. 10A and 10B show example embodiments of a three-dimensional plot comprising a plurality of points wherein each point represents a platform session as described herein. Such plots are referred to herein as three-dimensional event spaces since they represent information related to user inputs or events associated with an interactive promotional interface.

FIG. 11A is provided for illustration purposes. It shows an embodiment of a three-dimensional space where platform sessions are plotted based on their originally stored first-level platform engagement count 603, platform query count 604, and second-level platform engagement count 605. Thus, FIG. 11A is not based on transformed session records data. FIG. 11A illustrates an embodiment where the first-level platform engagement count (e.g., the axis labeled "number of deal impressions") dominates the clustering of platform sessions due to its unduly large size when compared to the other factors; that is, the locations of the plurality of points are skewed towards the axis corresponding to the number of tiles presented during a platform session. In this particular example embodiment, the first-level platform engagement count 603 is about twenty times larger than either platform query counts 604 or second-level platform engagement counts 605. The result is that clustering platform sessions based on the three-dimensional event space is impractical and provides limited insight.

In contrast, FIG. 11B shows a three-dimensional event space where platform sessions are plotted based on based on transformed session records as discussed in relation to method 4000. This embodiment illustrates how, due to the transformations effectuated by promotional server 104, the plurality of points comprise a single plane. Further, the three coordinates for each of the plurality of points on the plane adds up to 100%. Clustering user behavior based on this three-dimensional space provides more insights than what could be obtained from FIG. 11B as will be illustrated by the remainder of the discussion provided herein.

Clustering Platform Sessions

After generating the transformed session records, the promotional system 102 utilizes the transformed session records or the session coordinates data corresponding to each of the session records 608 to identify clusters of user behavior.

FIG. 5 shows a flowchart of an example method 5000 for clustering user behavior based session records. At 5200, promotional server 104 determines the number of clusters to be identified. In some embodiments, the number of clusters to be identified may be based on a pre-determined stored value (e.g., a value specifying five clusters) in the data repository. In other embodiments, the number of clusters to be identified may be based on user-defined input values provided to the promotional system. In yet other embodiments, the number of clusters is programmatically determined by promotional server 104; in this embodiment, promotional server 104 employs a statistical method or a machine-learning algorithm to identify an optimal number of clusters to be identified. For example, promotional server 104 may implement a gap statistic method, average silhouette approach, elbow method, or the like, to identify an optimal number of clusters to be identified. Ideally, the optimal choice of clusters will strike a balance between (1) minimizing the distance between a cluster location (e.g., a centroid representing a cluster) in the three-dimensional space and the data points (e.g., the session coordinates data corresponding to each of the plurality of session records rows) associated with the cluster and (2) maximum cluster-ing accuracy by assigning each data point to its own cluster. The details of the various possible solutions for optimizing the number of clusters are omitted herein avoid overcomplicating this disclosure.

At 5300, promotional server 104 generates, based on the number of clusters to be identified, a plurality of cluster-defining data. In other words, each of the clusters is associated with centroid coordinates data and a cluster identifier, which are hereby jointly referred to as cluster-defining data. The centroid coordinates data define a centroid location in a three-dimensional space and thus, necessarily include at least three values where each value specifies a quantity associated with one axis of the three-dimensional space. The centroid coordinates data is similar to the session coordinates data in that both sets of data comprise coordinates specifying locations in a three-dimensional space and thus may be used for mapping points in said space. In this manner, each set of centroid coordinates data represents the location of a cluster in the three-dimensional space. When promotional server 104 first generates the cluster-defining data, the initial values for the centroid coordinates data are randomized; that is, promotional server 104 assigns initially random values to each of the coordinates included in the centroid coordinates data.

In one embodiment, promotional server 104 then stores the cluster-defining data in a data repository. For example, promotional server 104 maps the clusters generated at step 5300 in the same three-dimensional space that includes the mapping of the transformed session records. As discussed in the context of step 4700 of method 4000, promotional server 104 may map the transformed session records onto a three-dimensional space by generating a table representing the three-dimensional space where platform sessions are there represented via their corresponding session coordinates data. Thus, in the context of method 5000, promotional server 104 may append the cluster-defining data to the table. As discussed in the context of step 4700 of method 4000, the table may include an indicator for keeping track whether a row corresponds to a platform session or a cluster. The indicator may be a Boolean variable taking one of two values: one or zero.

As also discussed in the context of step 4700 of method 4000, promotional server 104 may instead or in addition map the session records by generating a three-dimensional graph or plot comprising three axes. In this embodiment, mapping the session records comprises plotting a plurality of points representing platform sessions. Thus, in the context of method 5000, promotional server 104 may add points representing the clusters to the three-dimensional graph or plot. To do so, promotional server 104 utilizes the centroid coordinates data associated with each cluster via a cluster identifier. Thus, each cluster is represented by a point that is defined by the centroid coordinates data.

At 5400, promotional server 104 associates, for each session record, the session identifier with a cluster identifier. To that end, promotional server 104 first finds, for each platform session, a nearest cluster in the three-dimensional space. In other words, promotional server 104 compares the distance between a point in the three-dimensional space representing a platform session (e.g., a point defined by a set of session coordinates data) and each of the centroid locations represented in the three-dimensional space. Based on this comparison, promotional server 104 then determines the minimum such distance, and promotional server 104 subsequently associates the session identifier corresponding to the platform session being considered with the cluster identifier corresponding to the nearest centroid location (e.g., the centroid location associated with the minimum distance).

In some embodiments, promotional server 104 calculates the distances using a Euclidean distance formula. For example, promotional server 104 may utilize a Euclidean formula (1) to determine the distance between two points p—with coordinates ($p_1$, $p_2$, $p_3$)—and q—with coordinates ($q_1$, $q_2$, $q_3$)—in the three-dimensional space:

$$D(p,q)=\sqrt{d(p_1-Q_1)^2+(p_2-q_2)_2+(p_3-q_3)^2} \quad (1)$$

Thus, promotional server 104 programmatically implements Euclidean formula (1) to obtain the distance between a platform session—represented by session coordinates data (e.g., a transformed first-level platform engagement count, a transformed platform query count, and a transformed second-level platform engagement count)—and a cluster—represented by centroid coordinates data comprising an x-coordinate value, y-coordinate value, and z-coordinate value.

Promotional server 104 is thus configured to find the Euclidean distances between the platform session and each of the clusters mapped in the three-dimensional space. Subsequently, promotional server 104 then finds the cluster nearest to the platform session and associates the session identifier corresponding to the platform session with the cluster identifier corresponding to the nearest cluster.

Promotional server 104 repeats these steps for every platform session such that by the end of step 5400, every platform session mapped in the three-dimensional space becomes associated with one cluster identifier. Conversely, the cluster identifiers may be associated with one or more session identifiers.

At 5500, promotional server 104 modifies, for each cluster-defining data, the centroid coordinates data. At this step, promotional server 104 reassigns the centroid locations corresponding to each cluster to a new location. In one embodiment, promotional server 104 determines the new location for each cluster by calculating the average location of the plurality of platform sessions associated with the cluster.

For example, in one embodiment, promotional server 104 programmatically implements a method to calculate the center of mass of the plurality of platform sessions associated with a cluster. Taking a cluster A as an example, promotional server 104 first adds all transformed first-level platform engagement count values corresponding to the platform sessions that were associated with cluster A at step 5400. Subsequently, promotional server 104 divides the sum of all transformed first-level platform engagement values by the total number of platform sessions associated with cluster A. Promotional server 104 uses the resulting value to modify the x-coordinate value of the centroid coordinates data that is associated with cluster A.

Promotional server 104 then determines the new y-coordinate value for the centroid coordinates data that is associated with cluster A in a similar fashion. First, promotional server 104 adds all transformed platform query count values corresponding to the platform sessions that were associated with cluster A at step 5400. Subsequently, promotional server 104 divides the sum of all transformed platform query count values by the total number of platform sessions associated with cluster A. Promotional server 104 uses the resulting value to modify the y-coordinate value of the centroid coordinates data that is associated with cluster A.

Promotional server 104 then determines the new z-coordinate value for the centroid coordinates that associated with cluster A. First, promotional server 104 adds all transformed second-level platform engagement count values corresponding to the platform sessions that were associated with cluster A at step 5400. Subsequently, promotional server 104 divides the sum of all transformed platform query count values by the total number of platform sessions associated with cluster A. Promotional server 104 uses the resulting value to modify the z-coordinate value of the centroid coordinates data that is associated with cluster A.

Promotional server 104 finds the new x-coordinate values, y-coordinate values, and z-coordinate values for each of the remaining clusters to be identified in a manner similar to what was described above in the context of example cluster A.

A person having ordinary skill in the art would recognize that promotional server 104 would, in some embodiments, modify values stored in the data repository in order to modify the x-coordinate values, y-coordinate values, and z-coordinate values for the clusters. Namely, in one embodiment, promotional server 104 modifies, in promotional database 106, the centroid coordinates data associated with the cluster identifier that uniquely identifies the cluster whose coordinate values are to be modified. Promotional server 104 does so at step 5600 of method 5000.

At 5700, promotional server 104 compares the previous centroid coordinates data with the newly generated centroid coordinates data (generated at step 5500) associated with each of the clusters. If promotional server 104 rinds that the centroid coordinates data for all clusters has remained the same, then promotional server 104 advances to step 5800 where method 5000 ends.

On the other hand, returning to step 5700, if promotional server 104 determines that the centroid coordinates data corresponding to any of the clusters has changed, then promotional server 104 returns to step 5400, where it iteratively repeats steps 5400-5700. Thus, promotional server 104 reassigns centroid locations for each of the clusters iteratively until all the centroid locations remain in the same location for two consecutive iterations of steps 5400-5700.

At the end of method 5000, the data repository includes an association between a cluster identifier and a centroid coordinates data for all the cluster identifiers, wherein the centroid coordinates data identifies the location of the identified clusters. In another sense, each of the locations corresponding to the identified clusters also corresponds to a center of mass of a group of platform sessions in the three-dimensional space. Each of said groups of platform sessions have features that are similar among the platform sessions. In this context, the similarities represent user behavior captured via user inputs during each of the platform sessions.

FIG. 12 shows an example embodiment depicting a visualization of method 5000 for clustering user behavior based on platform sessions. FIG. 12 shows an embodiment of the platform sessions shown in FIG. 11B except that instead of showing it in three-dimensions, the clusters are shown in the two-dimensional plane corresponding to the triangular plane observed in FIG. 11B (See FIG. 11B, where all locations corresponding to platform sessions are shown as falling in a triangular plane). In the embodiment illustrated in FIG. 12, five separate clusters were generated for identification. The initial, randomized locations of the clusters are shown as 1101a-1105a, whereas the final, identified locations of the clusters are shown as 1101b-1105b. As shown in the visualization of FIG. 11, each of the locations of the clusters changed between iterations of steps 5400-5700 of method 5000 until the final cluster locations were identified. The intermediate locations of the clusters are shown as traces connecting the initial, randomized locations to the final identified, locations of the clusters.

Using Clusters of User Behavior Based on Platform Sessions

As described above, promotional server 104 is configured to find clusters of user behavior based on session records. At the conclusion of a method for clustering user behavior, such as method 5000, promotional server 104 stores in the data repository a plurality centroid coordinates data that represent the locations of a plurality of clusters in the three-dimensional space. The utility of identifying clusters of user behaviors is illustrated with a few examples in this disclosure. However, a person having ordinary skill in the art would recognize that the present disclosure could be used in the promotional system 102 for a variety of additional purposes besides those described herein.

In one embodiment, the promotional system 102 may define behavior categorization boundaries for each platform session and the promotional system 102 may analyze the purchase rates for platform sessions that fall within each categorization. For example, FIG. 13 shows an example embodiment where the promotional system 102 defines behavior categorization boundaries in a two-dimensional plane. The two-dimensional plane may correspond to a triangular plane observed in a three-dimensional space where platform sessions are mapped such as that seen in FIG. 11B (See FIG. 11B, where all locations corresponding to platform sessions are shown as falling in a triangular plane even though FIG. 11B is a three-dimensional space). The two-dimensional plane may further be similar to the two-dimensional plane discussed in the context of FIG. 12.

Returning to FIG. 13, the two-dimensional plane where all platform sessions fall is divided into five category areas 1101-1105. Each of the areas is bound by a categorization boundary calculated by promotional server 104 based on the centroid coordinates data associated with the five cluster identifiers. In one embodiment, promotional server 104 determines the centroid coordinate data sets for the five clusters according to a method similar to method 5000 previously described herein.

In generating the five category areas 1101-1105, server 105 determines the purchase rate associated with each of the category areas. To that end, server 105 utilizes an indicator of whether a platform session resulted in a purchase such as platform output status indicator 606 (see FIG. 6). For example, considering category area 1101, server 105 would first determine the cluster identifier associated with the centroid coordinates data corresponding to the area bound by category area 1101. Subsequently, server 105 retrieves from the data repository all session records, such as session records 608 (see FIG. 6), that are associated with the cluster identifier corresponding to category area 1101.

Thus, to determine the purchase rate, server 105 is configured to generate (1) a divisor comprising a value equal to the sum of the total number of platform sessions associated with the cluster identifier corresponding to category area 1101. (2) a dividend comprising a value equal to the total number of platform sessions that resulted in a consume purchase (e.g., the total number of session records 608 storing a "1" in the platform output status indicator 606), and (3) a purchase rate comprising the quotient resulting from dividing the values generated at (1) and (2).

Returning to the embodiment illustrated in FIG. 13, the purchase rate for category area 1101 is 1%, category area 1102 is 3%, category area 1103 is 11%, category area 1104 is 10%, and category area 1105 is 5%. A promotional system 102 may use the purchase rates and other collected data to classify and describe the behavior exhibited in during each of the platform sessions considered. The table reproduced below illustrates one embodiment for categorizing user behavior based on the platform sessions and describing the expected user behavior associated with each of those sessions.

| Color | Name | Purchase Rate | Population Size | Behavior |
| --- | --- | --- | --- | --- |
| Red | Bad Hunter | 0.9% | 10.3% | Searches, but finds either few results, or results do not merit viewing |
| Purple | Scroller | 3.4% | 18.4% | Scrolls Impressions, but views few deals |
| Dark Blue | Bouncer | 4.9% | 38.6% | Only views deals (likely from email or a search engine result), doesn't get many impressions or do searches |
| Green | Gatherer | 9.8% | 15.8% | Scrolls Impressions, and also views deals |
| Light Blue | Hunter | 11.1% | 16.8% | Searches, finds interesting results, and views them |

Thus, with reference to FIG. 13, category area 1101 corresponds to the Bad Hunters categorization, category area 1102 corresponds to the Scrollers categorization, category area 1103 corresponds to the Hunters categorization, category area 1104 corresponds to the Gatherers categorization, and category area 1105 corresponds to the Bouncers categorization.

For further context, the platform sessions falling in the Bad Hunters category have a large number of searches, but relatively few tiles presented, very few item views, and a very low purchase rate. The only way to do this would be for a user to submit search queries (often repeatedly) for items that either don't exist in promotion and marketing service, or to which the promotional system 102 provides poor matches—that is, the search results comprise items that do not match what a user expected to obtain from submitting a search query. This category is labeled "Bad Hunters" because, based on the general behavior exhibited during a platform session, these users seem to know what they are looking for, but they largely return empty-handed.

The platform sessions falling in the Scrollers category have a very large number of tiles presented, but few search queries or item views, and a poor purchase rate. To produce this behavior, a user would have to scroll over very long lists of tiles to collect many tiles presented, but click through very few of those tiles. This category is thus labeled as "Scrollers", as they browse over a very large number of tiles but see relatively little that catches their interest.

The platform sessions in the Bouncers category can have a large relative proportion of item views, but relatively few search queries or tiles presented. The only way to produce a platform session with such few tiles presented is to click a deal link either from email or a search engine, and then to leave the website or mobile app without further exploration. As a result, this category is labeled "Bouncers." Their purchase rate is middling at best. It should also be noted that this is the most prevalent group, including almost 40% of all platform sessions.

The platform sessions falling in the Gatherers category have relatively few search queries but have a healthy mixture of tiles presented and item views. They likely scroll quite a bit without necessarily knowing precisely what they're looking for, but they find tiles that interest them and click on them. We term this category "Gatherers."

The platform sessions falling in the Hunters category have a mixture of item views, tiles presented, and search queries. They likely submit search queries often, which returns tiles associated with items that interest them, and they then click on those tiles. These users look for what they want and often find it, and so this category is labeled as "Hunters." Purchase rates are highest for this group, though only marginally greater than the platform sessions falling under the Gatherers category.

Using such clear categorizations of user behavior based on platform sessions, the promotional system 102 may segment the results of A/B experiments to gain greater insight into user behaviors from the A/B experiments. FIG. 14 shows an example embodiment of an A/B testing interface that incorporates the present disclosure. There, an A/B testing interface provides results from A/B experiments. Further, the A/B testing interface enables a user to select, via drop-down menu 1401, one of the user behavior categories. Each of the user behavior categories of drop-down menu 1401 may be an identified cluster using a clustering method such as method 5000 disclosed herein. Returning to FIG. 14, promotional server 104, in response to receiving user input data indicating a selection of a user behavior via drop-down menu 1401, causes the rendered experiment results and analysis to be filtered according to the user selection. For example, if a user selects the user behavior category corresponding to "hunter." then promotional server 104 is configured to only display experiment results associated with platform sessions falling under the Hunter category area (see, e.g., FIG. 13). Accordingly, in such a scenario, the A/B testing interface provides a T-score, Lift, and session totals based on only those platform sessions falling under the Hunter category. Similarly, because the segmentation causes the A/B testing interface to analyze subsets of the total population of platform sessions, the Status 1402 may be different for separate categories. For example, even though the status is "flat" for the currently selected category in FIG. 14, the status may not be "flat" for other categories.

In a different embodiment, promotional server 104 categorizes user accounts utilizing clusters of user behavior based on platform sessions. For example, in this embodiment, promotional server 104 is configured to collect and store session records. In one embodiment, the manner of collecting and storing session records utilizes the techniques discussed in the context of method 3000 and method 4000 step 4200. As previously discussed, promotional system 102 is configured to store the session records in a sessions data table as illustrated in FIG. 6. There, a row corresponding to session records 608 includes a user account identifier 602. Thus, session records 608 are associated with user accounts via the user account identifiers 602.

For further context, a user of a consumer device 108 may create a user account by providing various types of information. In this regard, the user may create an account and provide payment information, credential information such as a user account name and a user account password, and discretionary data such as information relating to user demographics (e.g., age, gender, etc.), interests, hobbies, location etc. Upon receiving inputs indicating that a user account has been created or is to be created, promotional server 104 is configured to generate user account data for storing in the data repository. The user account data comprises a user account identifier, user account name, user account password, and other data.

Subsequently, when a user of a consumer device 108 logs into the promotional system 102 (such as via a log-in interface where the user may provide a user account name, user account password, and/or other credentials) and accesses an interactive promotional interface, promotional server 104 initiates a platform session. As part of initiation a platform session, promotional server 104 generates a session record, such as session records 608 of FIG. 6, that associates the user account identifier with a session identifier. As previously discussed in the context of methods 3000 and 4000, promotional server 104 is configured to terminate the platform session at the completion of a purchase, when the user closes the website or mobile app providing the interactive promotional interface, or when the promotional server 104 detects that the user has been idle for a predetermined period of time.

However, for each subsequent time that the user of a consumer device 108 accesses the promotional system 102, a new platform session is generated, which promotional server 104 associates with the user account corresponding to the user of the consumer device 108. In this manner, a user account may have a plurality of platform sessions associated to it, each of which comprises a respective session record of the session records 608.

Thus, promotional server 104 is configured to generate transformed session records data and session coordinates data for each of the platform sessions associated with a user account identifier. To generate the transformed session records data, promotional server 104 may utilize techniques similar to those discussed in the context of method 4000. Similarly, promotional server 104 is configured to identify for each platform session the nearest cluster. Promotional server 104 may utilize techniques similar to those discussed in the context of method 5000. As a consequence of employing these techniques, promotional server 104 associates every platform session with a cluster identifier.

Promotional server 104 may subsequently determine the proper cluster to associate with the user account. For example, in one embodiment, promotional server 104 determines the cluster identifier most frequently associated with platform sessions associated with the user account. Promotional server 104 may then associate the user account identifier with the cluster identifier such as by including the cluster identifier as part of a table storing all user account data.

A person having ordinary skill in the art would recognize that other methods for associating a user account identifier to a cluster identifier may be implemented. For example, instead of basing the association on the most frequently associated cluster identifier with platform sessions, promotional server 104 may use a subset of the most recent platform sessions generated by a user as the basis for clustering the user behavior.

Once promotional server 104 has associated the user account with a cluster identifier, then the promotional system 102 may use such an association to improve the content presented for its users.

In one embodiment, promotional server 104 sends different interactive promotional interface data based on the cluster identifier that is associated with a user account. For example, a first user of a first consumer device 108 may log into the promotional system 102 by providing a user account name and a user account password corresponding to a user account that is associated with a first cluster identifier. In response to receiving the credentials associated with the user account for the first user, promotional server 104 determines that the user account is associated with a first cluster identifier and, as a consequence, sends a first version of an interactive promotional interface data. The first version of an interactive promotional interface data is configured to cause a consumer device 108 to display an interactive promotional interface comprising a first configuration. For example, FIG. 15A illustrates an example first layout that may be implemented by the interactive promotional interface in relation to this embodiment. There, tiles are represented by rectangular slots 1501, 1502, and 1503. Notably, only three tiles are displayed for a user via the display of consumer device 108.

Continuing with the same embodiment, a second user of a second consumer device 108 may log into the promotional system 102. There the second user may provide as user input a user account name and a user account password corresponding to a user account that is associated with a second cluster identifier. In response to receiving such input, promotional server 104 would then determine that the user account is associated with a second cluster identifier and, as a consequence, sends a second version of an interactive promotional interface data. The data is configured to cause the consumer device 108 to display an interactive promotional interface comprising a second configuration. For example, FIG. 15B illustrates an example second layout that may be implemented by the interactive promotional interface in relation to this embodiment. There, tiles are represented by rectangular graphics 1504, 1505, 1506, 1507, 1508, 1509, 1510, and 1511. Notably eight tiles are displayed for a user via the display of consumer device 108.

As an additional example, in one embodiment, FIG. 8 may comprise a configuration for the interactive promotional interface displayed in a consumer device 108 when the consumer device 108 is in use by a user associated with a user account that is, in turn, associated with a first cluster identifier. On the other hand. FIG. 10 may comprise a second configuration for the interactive promotional interface displayed in a consumer device 108 when the consumer device 108 is in use by a user associated with a second user account that is, in turn, associated with a second cluster identifier. Thus, promotional system 102 may be configured to display different configurations of an interactive promotional interface depending on the cluster identifier with which a user is associated.

Signal Diagram

FIGS. 16A and 16B show a signal diagram of an example data flow represented by method 6000, which exemplifies a method for clustering user behavior based on platform sessions data. Method 6000 is described as being performed by a promotional server 104, a consumer device 108, and a promotional database 106. These may be similar to those previously discussed with regards to FIG. 1.

At 6010, promotional server 104 receives access request data from consumer device 108. In one embodiment, the access request data may be the result of opening a specific web page via a web browser application in the consumer device 108. In such an embodiment, then the access request data comprises an HTTP request. In other embodiments, the access request data may be received by promotional server 104 as a result of a user opening or executing a mobile application installed in the consumer device 108. In either embodiment, the consumer device 108 is configured to send request data to promotional server 104 via a network.

In some embodiments, alter receiving the initial access request data, promotional server 104 sends log-in data to consumer device 108, where the log-in data is configured to cause consumer device 108 to render a log-in interface via a display screen of the consumer device 108. In this manner, promotional server 104 enables a user to input credentials, such as a user account name and a user account password, associated with a user account. Thus, in this embodiment, after receiving the log-in input data from consumer device 108, then promotional server 104 determines whether the input data matches the data stored for a user account. If the data matches, then promotional server 104 proceeds to step 6020. If the data does not match the data stored for a user account, then promotional server 104 may cause consumer device 108 to again request input credentials from the user. These initial steps and inputs are omitted from FIGS. 16A and 16B to avoid overcomplicating the figure.

At 6020, promotional server 104 generates a session records row configured for storage in promotional database 106. The records row may be similar to session records 608 discussed in the context of FIG. 6. Additional details regarding the generation of a row of session records 608 may be found in the discussion of step 4200 of method 4000 provided herein. Importantly, the session records row includes a session identifier that uniquely identifies the session records row.

At 6030, promotional server 104 sends, to promotional database 106, the newly generated the session records row for storage. In some embodiments, the newly generated session records row is appended to a sessions data table such as that embodied in FIG. 6. Additional details regarding the sessions data table may be found in the discussion of step 4200 of method 4000 provided herein.

At 6040, promotional server 104 determines the number of tiles to be presented to a user via the consumer device 108. As part of 6040, promotional server 104 generates interactive promotional interface data that is configured to cause consumer device 108 to render an interactive promotional interface on a display. Thus, the number of tiles to be presented depend on the interactive promotional interface data. For example, in some configurations, the interactive promotional interface data may cause the consumer device to initially render three tiles for the user; in other configurations, the interactive promotional interface data may cause the consumer device to initially render eight tiles for the user.

At 6050, promotional server 104 modifies the session records row to reflect, via a first-level platform engagement count, the number of tiles presented to a user via the consumer device 108.

At 6060, promotional server 104 sends, to consumer device 108, interactive promotional interface data configured to cause the consumer device 108 to render an interactive promotional interface via a display. Additional details regarding the interactive promotional interface data may be found in the discussions of methods 3000 and 4000 provided herein At 6070, promotional server 104 receives, from the user of consumer device 108, user input data. The discussion of step 4200 of method 4000 is particularly relevant regarding the user input data involved in 6070. The user input data comprises, for example, data capturing the clicking and dragging of a scrolling component, data comprising a search query submitted via a query input component, data capturing mouse clicks, screen taps or keyboard inputs by which a user selects a tile to cause item views to be rendered, data capturing a series of user selections and data inputs that execute a transaction such as a purchase of an item, and the like. Other examples of input data may comprise data capturing mouse clicks executed by the user in areas of the interactive user interface that do not necessary select a tile or an actuator button 901 (see FIG. 9).

Even though promotional server 104 does not necessarily utilize some types of user inputs to modify values stored in the session records row, promotional server 104 may utilize some of these inputs to determine whether a user has been idle (e.g., has not provided any user inputs) for a predetermined amount of time. In some embodiments, when a user has been idle for a pre-determined amount of time, promotional server 104 ends the session and stops updating a session records row.

At 6080, promotional server 104 parses the received user input data (from step 6070) to determine the type of input that the data comprises (e.g., the type of user action specified by the user input data) and to determine the proper actions or outputs to be sent to the consumer device 108. At 6090, promotional server 104 modifies the session records row according to the user input data received. Additional details regarding the effects of certain user inputs are provided in the discussion of step 4200 of method 4000 provided herein. For example, scrolling through the interactive promotional interface causes promotional server 104 to increase a first-level platform engagement count in the session records row. Similarly, clicking on a tile, which causes consumer device 108 to render an item view, causes promotional server 104 to increase a second-level platform engagement count in the session records row. Submitting a search query via a query input component causes promotional server 104 to increase a platform query count in the session records row. Finally, purchasing an item via the interactive promotional interface causes promotional server 104 to increase a platform output status indicator.

At 6095, promotional server 104 sends interactive promotional interface data to consumer device 108 to reflect the proper output corresponding to the user input received at 6070. For example, at 6095, promotional server 104 may send data that causes the consumer device 108 to render an item view or to render the results of a search query or to render additional tiles as a result of scrolling, etc.

A person having ordinary skill in the art would understand that steps 6070-6095 may be iteratively repeated until a platform session ends. In this manner, promotional server 104 would collect and record all relevant data associated with a user's behavior during a platform session. As discussed in the context of methods 3000 and 4000, a platform session ends when a user becomes idle for a pre-determined period of time, when the user purchases an item through promotional server 104, closes the browser where the interactive promotional interface is rendered, closes the mobile application utilized to access promotional server 104. In this manner, if the user continues accessing content via the interactive promotional interface after a session ends, promotional server 104 generates a new session records row with a new unique session identifier.

At 6100, promotional server 104 retrieves, from promotional database 106, the first-level platform engagement count for all the session records being stored in promotional database 106. Additional details regarding this step may be found in the discussion of step 4300 of method 4000 provided herein.

A person having ordinary skill in the art would understand that the step of retrieving any information from the database involves a request message being sent to promotional database 106 and a subsequent response from promotional database 106 comprising the data being requested via the request message. This general request/response dynamic applies to this and subsequent steps discussed herein where promotional server 104 retrieves data from promotional database 106.

At 6110, promotional server 104 generates intermediate first-level platform engagement counts for each of the session records. Additional details regarding the intermediate first-level platform engagement counts may be found in the discussion of step 4300 of method 4000 provided herein. In at least one embodiment, the intermediate first-level platform engagement counts are generated by dividing the value stored in the first-level platform engagement counts by the same divisor. In one embodiment, the divisor is pre-determined to be a factor of 20.

At 6120, promotional server 104 stores the intermediate first-level platform engagement counts in promotional database 106. In some embodiments, the intermediate first-level platform engagement counts are appended to each of their corresponding session records rows such as rows of session records 608 of FIG. 6. Additional details regarding the storage of the intermediate first-level platform engagement counts may be found in the discussion of step 4400 of method 4000 provided herein.

At 6130, promotional server 104 retrieves the intermediate first-level platform engagement counts, platform query counts, and second-level platform engagement counts for each session records row. Additional details regarding 6130 may be found in the discussion of step 4500 of method 4000 provided herein.

At 6140, promotional server 104 generates, for each platform session (corresponding to a session records row), transformed session records data. Additional details regarding the generation of the transformed session records may be found in the discussion of step 4500 of method 4000 provided herein.

At 6150, promotional server 104 stores the newly generated transformed session records data in promotional database 106. In some embodiments, the transformed session records data is appended to the corresponding session records row in the sessions data table. Additional details regarding this step may be found in the discussion of step 4600 of method 4000 provided herein. As discussed there, in some embodiments, promotional server 104 also, and optionally, generates a set of session coordinates data for each session record. The session coordinates data comprise the transformed session records (e.g., the transformed first-level platform engagement count, platform query count, and second-level platform engagement count). Promotional server 104 subsequently stores the session coordinates data in promotional database 106 and associates the session coordinates data to their corresponding session via a session identifier.

At optional step 6160, promotional server 104 generates transformed session records mapping data. The transformed mappings data may comprise a table representing a three-dimensional space where platform sessions are represented via session coordinates data comprising the transformed session records data. Alternatively, the transformed session records mapping data may comprise the generating of a three-dimensional graph or plot comprising three axes: (1) a first-level platform engagement count axis, (2) a platform query count axis, and (3) a second-level platform engagement count axis. Subsequently, promotional server 104 may map the session records by plotting a plurality of points on the generated three-dimensional graph or plot. Serve 104 determines the location of each of the plotted points based on the transformed session records data (or the session coordinates data) corresponding to each of the platform sessions stored in promotional database 106.

Additional details regarding the table representing a three-dimensional space and the three-dimensional graph or plot may be found in the discussion of step 4700 of method 4000 provided herein.

At optional step 6170, promotional server 104 stores the transformed session records mapping data in promotional database 106. Further, at optional step 6180, promotional server 104 may send the transformed session records mapping data to a consumer device 108 or any other client device (for example, a merchant device) that may form part of a promotional system 102 (see FIG. 1) for rendering via a display.

At 6190, promotional server 104 determines the number of clusters to be identified. Additional details regarding the determination of the number of clusters to be identified may be found in the discussion of step 5200 of method 5000 provided herein.

At 6200, promotional server 104 generates cluster-defining data which comprises at least a cluster identifier and centroid coordinates data for each of the clusters to be identifier (determined at step 6190). Additional details regarding the cluster-defining data may be found in in the discussion of step 5300 of method 5000 provided herein.

At 6210, promotional server 104 stores the newly generated cluster-defining data in promotional database 106. Additional details regarding this storing step may be found in the discussion of method 5000 provided herein. Similar to the discussion of method 5000, step 6210 may comprise mapping the clusters associated with the cluster-defining data in a manner similar to how the platform sessions are mapped, such as in steps 6160 and 4700. In other words, the cluster-defining data may be appended to a table representing the three-dimensional space where platform sessions are represented via their corresponding session coordinates data. In some embodiments, promotional server 104 may instead or in addition plot points representing the clusters (by utilizing the centroid coordinates data corresponding to each cluster) in the three-dimensional graph or plot optionally generated at 6170.

At 6220, promotional server 104 retrieves the transformed session records data for each of the session records rows in promotional database 106. In other embodiments, instead of the transformed session records data, promotional server 104 retrieves the session coordinates data associated with each of the session identifiers stored in promotional database 106. The minor distinction between the transformed session records data and the session coordinates data does not affect the clustering of user behavior and either type of data may be used for step 6220-6290.

At 6230, promotional server 104 retrieves the cluster-defining data for each cluster, including the centroid coordinates data of each cluster.

At 6240, promotional server 104 finds, for each platform session as represented by its transformed session records data (or session coordinates data), the nearest cluster. Additional details regarding how promotional server 104 finds the nearest cluster to each platform session may be found in the discussion of step 5400 of method 5000. In essence, for this step, each platform session comprises three coordinates: transformed first-level platform engagement count, platform query count, and transformed second-level platform engagement count. Additionally, each cluster also comprises three coordinates as specified by its centroid coordinates data: x-coordinate value, y-coordinate value, and z-coordinate value. Thus, promotional server 104 is configured to find the nearest cluster (as represented by its centroid coordinates data) to each of the platform sessions (as represented by its transformed session records data or session coordinates data).

At 6250, promotional server 104 associates each session identifier with the cluster identifier of the cluster nearest the platform session corresponding to the session identifier; and at 6260, promotional server 104 stores the association in promotional database 106. In this manner, every session identifier becomes associated with one cluster identifier. Further, each cluster identifier is associated with a plurality of session identifiers. This discussion assumes an environment where the number of session records are much larger than the number of clusters to be identified. Promotional server 104 may associate the session identifiers with the cluster identifiers using various techniques. For example, promotional server 104 may append, for each session records row, a cluster identifier to a session records row stored in a sessions data table in promotional database 106. Alternatively, promotional server 104 may append, for each cluster, a session identifier to the data structure storing the cluster-identifying data of each cluster; in this manner, each of the data structures storing the cluster-identifying data of each cluster would comprise, by the end of 6250 and 6260, a plurality of session identifiers. In another embodiment, promotional server 104 may create a separate table or data structure where the cluster identifiers and the session identifiers are mapped to or associated with each other.

At 6270, promotional server 104 generates, for each cluster, new centroid coordinates data, and at 6280, promotional server 104 modifies, in promotional database 106, the centroid coordinates data for each cluster based on the newly generated centroid coordinates data. Additional details regarding this step may be found in the discussion of step 5500 of method 5000 provided herein. As discussed above, each cluster becomes associated with a plurality of platform sessions at step 6260. Thus, at step 6270, promotional server 104 calculates, for each of the clusters, a center of mass based on the transformed session records data (or the session coordinates data) of each platform session associated with the cluster. In other words, each cluster is associated with a plurality of platform sessions, each having transformed session coordinates data (and/or session coordinates data) that represent a point in a three-dimensional space. Thus, for each cluster, promotional server 104 calculates the average position of the points associated with the cluster. These average positions, expressed in three-dimensional coordinates, comprise the clusters' center of mass. Thus, at 6270, promotional server 104 generates, for each cluster, new centroid coordinates data corresponding to each cluster's center of mass. At 6280, promotional server 104 modifies, for each cluster, the centroid coordinates data with the newly generated centroid coordinates data that corresponds to each cluster's center of mass.

At 6290, promotional server 104 determines whether any cluster's centroid coordinates data changed as a result of 6270-6280. In one embodiment, promotional server 104 may do this by temporarily storing the original values stored in the centroid coordinates data for each cluster before modifying those values at 6280. Thus, promotional server 104 may then compare the temporarily stored values of the centroid coordinates data with those values stored in the database (corresponding to the newly generated centroid coordinates data). If the original values are equal to the newly generated values, then promotional server 104 determines that no cluster's centroid coordinates data changed, and method 6000 ends. On the other hand, if promotional server 104 determines that the original values are not equal to the newly generated values, then promotional server 104 repeats steps 6220-6290 of method 6000. In this manner, the centroid coordinates data iteratively changes until the clusters are identified and, thus, the centroid coordinates data becomes stable; e.g., at the end of method 6000, promotional database 106 stores the centroid coordinates data which comprise the coordinates of the identified clusters of user behavior as stored in the platform sessions.

The flow chart operations described with reference to FIGS. 3, 4, 5, 16A, and 16B support combinations of means for performing the specified functions and combinations of operations for performing the specified functions. It will be understood that one or more operations of the flow charts, and combinations of operations in the flow charts, may be implemented by special purpose hardware-based computer systems which perform the specified functions, or combinations of special purpose hardware and computer instructions.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus comprising a processor and a non-transitory memory storing program instructions, wherein the non-transitory memory and the program instructions are configured to, with the processor, cause the apparatus to:
collect, via an interaction user interface displayed on each of a plurality of client devices associated with a plurality of user accounts, a plurality of session records associated with a plurality of platform sessions, wherein the interaction user interface comprises one or more tiles, one or more item views associated with the one or more tiles, and a query input component;
determine, based at least in part on the plurality of session records, a plurality of first-level platform engagement counts associated with the one or more tiles, a plurality of platform query counts associated with the query input component, and a plurality of second-level platform engagement counts associated with the one or more item views;
determine a plurality of intermediate first-level platform engagement counts based at least in part on dividing each of the plurality of first-level platform engagement counts by a first-level platform engagement normalization factor;
determine a plurality of transformed first-level platform engagement counts based at least in part by dividing the plurality of intermediate first-level platform engagement counts by a session-specific normalization factor;
generate session coordinates data based at least in part on the plurality of transformed first-level platform engagement counts, the plurality of platform query counts, and the plurality of second-level platform engagement counts, wherein the session coordinates data defines a platform session location for each of the plurality of platform sessions in a three-dimensional data space;
generate cluster-defining data by at least mapping the plurality of session records to the three-dimensional data space based at least in part on the session coordinates data, wherein the cluster-defining data indicates a plurality of data clusters in the three-dimensional data space; and
associate each of the plurality of user accounts with at least one of the plurality of data clusters based at least on the session coordinates data and the cluster-defining data.

2. The apparatus of claim 1, wherein the non-transitory memory and the program instructions are configured to, with the processor, cause the apparatus to associate each of the plurality of intermediate first-level platform engagement counts with a session identifier of a plurality of session identifiers associated with the plurality of platform sessions.

3. The apparatus of claim 1, wherein the non-transitory memory and the program instructions are configured to, with the processor, cause the apparatus to generate a plurality of transformed session records comprising a plurality of transformed second-level platform engagement counts, a plurality of transformed platform query counts, and the plurality of transformed first-level platform engagement counts.

4. The apparatus of claim 3, wherein the non-transitory memory and the program instructions are configured to, with the processor, cause the apparatus to determine the plurality of transformed second-level platform engagement counts based at least in part by dividing the plurality of second-level platform engagement counts by the session-specific normalization factor.

5. The apparatus of claim 3, wherein the non-transitory memory and the program instructions are configured to, with the processor, cause the apparatus to determine the plurality of transformed platform query counts based at least in part by dividing the plurality of platform query counts by the session-specific normalization factor.

6. A computer-implemented method comprising:
collecting, via an interaction user interface displayed on each of a plurality of client devices associated with a plurality of user accounts, a plurality of session records associated with a plurality of platform sessions, wherein the interaction user interface comprises one or more tiles, one or more item views associated with the one or more tiles, and a query input component;
determining, based at least in part on the plurality of session records, a plurality of first-level platform engagement counts associated with the one or more tiles, a plurality of platform query counts associated with the query input component, and a plurality of second-level platform engagement counts associated with the one or more item views;

determine a plurality of intermediate first-level platform engagement counts based at least in part on dividing each of the plurality of first-level platform engagement counts by a first-level platform engagement normalization factor;

determine a plurality of transformed first-level platform engagement counts based at least in part by dividing the plurality of intermediate first-level platform engagement counts by a session-specific normalization factor;

generating session coordinates data based at least in part on the plurality of transformed first-level platform engagement counts, the plurality of platform query counts, and the plurality of second-level platform engagement counts, wherein the session coordinates data defines a platform session location for each of the plurality of platform sessions in a three-dimensional data space;

generating cluster-defining data by at least mapping the plurality of session records to the three-dimensional data space based at least in part on the session coordinates data, wherein the cluster-defining data indicates a plurality of data clusters in the three-dimensional data space; and associating each of the plurality of user accounts with at least one of the plurality of data clusters based at least on the session coordinates data and the cluster-defining data.

7. The computer-implemented method of claim 6, further comprising associating each of the plurality of intermediate first-level platform engagement counts with a session identifier of a plurality of session identifiers associated with the plurality of platform sessions.

8. The computer-implemented method of claim 6, further comprising generating a plurality of transformed session records comprising a plurality of transformed second-level platform engagement counts, a plurality of transformed platform query counts, and a plurality of transformed first-level platform engagement counts.

9. The computer-implemented method of claim 8, further comprising determining the plurality of transformed second-level platform engagement counts based at least in part by dividing the plurality of second-level platform engagement counts by the session-specific normalization factor.

10. The computer-implemented method of claim 8, further comprising determining the plurality of transformed platform query counts based at least in part by dividing the plurality of platform query counts by the session-specific normalization factor.

11. A computer program product comprising at least one non-transitory computer-readable storage medium having computer-readable program code portions stored therein, the computer-readable program code portions comprising an executable portion configured to:

collect, via an interaction user interface displayed on each of a plurality of client devices associated with a plurality of user accounts, a plurality of session records associated with a plurality of platform sessions, wherein the interaction user interface comprises one or more tiles, one or more item views associated with the one or more tiles, and a query input component;

determine, based at least in part on the plurality of session records, a plurality of first-level platform engagement counts associated with the one or more tiles, a plurality of platform query counts associated with the query input component, and a plurality of second-level platform engagement counts associated with the one or more item views;

determine a plurality of intermediate first-level platform engagement counts based at least in part on dividing each of the plurality of first-level platform engagement counts by a first-level platform engagement normalization factor;

determine a plurality of transformed first-level platform engagement counts based at least in part by dividing the plurality of intermediate first-level platform engagement counts by a session-specific normalization factor;

generate session coordinates data based at least in part on the plurality of transformed first-level platform engagement counts, the plurality of platform query counts, and the plurality of second-level platform engagement counts, wherein the session coordinates data defines a platform session location for each of the plurality of platform sessions in a three-dimensional data space;

generate cluster-defining data by at least mapping the plurality of session records to the three-dimensional data space based at least in part on the session coordinates data, wherein the cluster-defining data indicates a plurality of data clusters in the three-dimensional data space; and associate each of the plurality of user accounts with at least one of the plurality of data clusters based at least on the session coordinates data and the cluster-defining data.

12. The computer program product of claim 11, wherein the computer-readable program code portions comprise the executable portion configured to associate each of the plurality of intermediate first-level platform engagement counts with a session identifier of a plurality of session identifiers associated with the plurality of platform sessions.

13. The computer program product of claim 11, wherein the computer-readable program code portions comprise the executable portion configured to generate a plurality of transformed session records comprising a plurality of transformed second-level platform engagement counts, a plurality of transformed platform query counts, and the plurality of transformed first-level platform engagement counts.

14. The computer program product of claim 13, wherein the computer-readable program code portions comprise the executable portion configured to determine the plurality of transformed second-level platform engagement counts based at least in part by dividing the plurality of second-level platform engagement counts by the session-specific normalization factor.

15. The computer program product of claim 13, wherein the computer-readable program code portions comprise the executable portion configured to determine the plurality of transformed platform query counts based at least in part by dividing the plurality of platform query counts by the session-specific normalization factor.

* * * * *